Feb. 26, 1963   G. W. GRAY   3,078,944
VEHICLE CONTROL SYSTEMS
Filed April 28, 1960   8 Sheets-Sheet 1

INVENTOR.
GEORGE W. GRAY
BY Morris Rabkin
ATTORNEY

INVENTOR.
GEORGE W. GRAY
BY
ATTORNEY

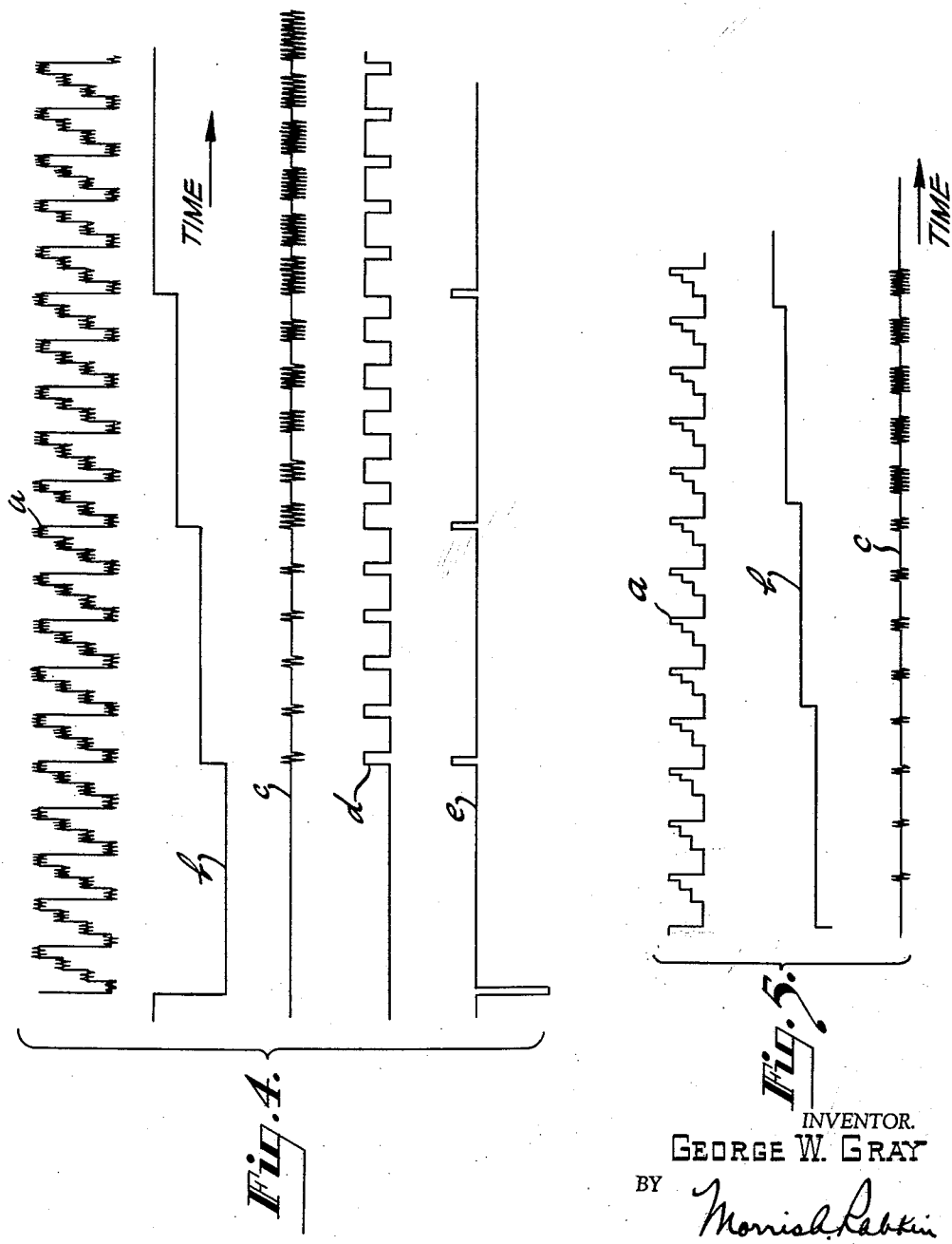

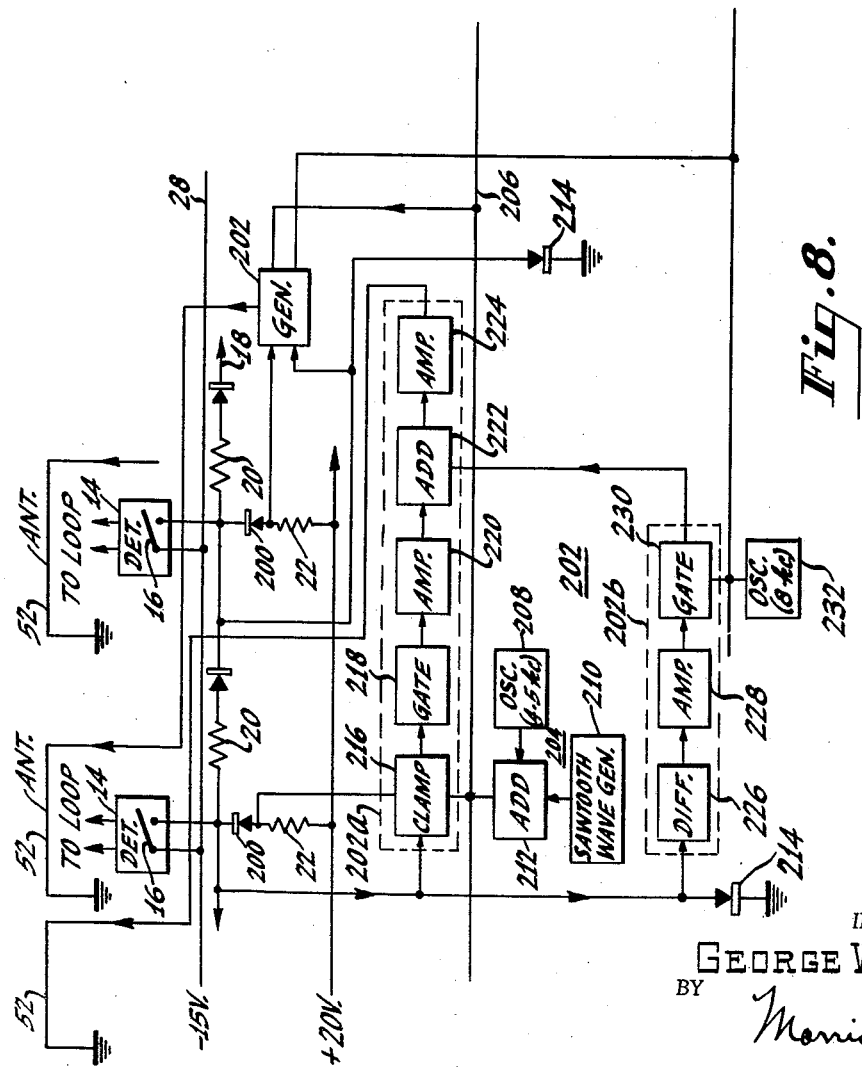

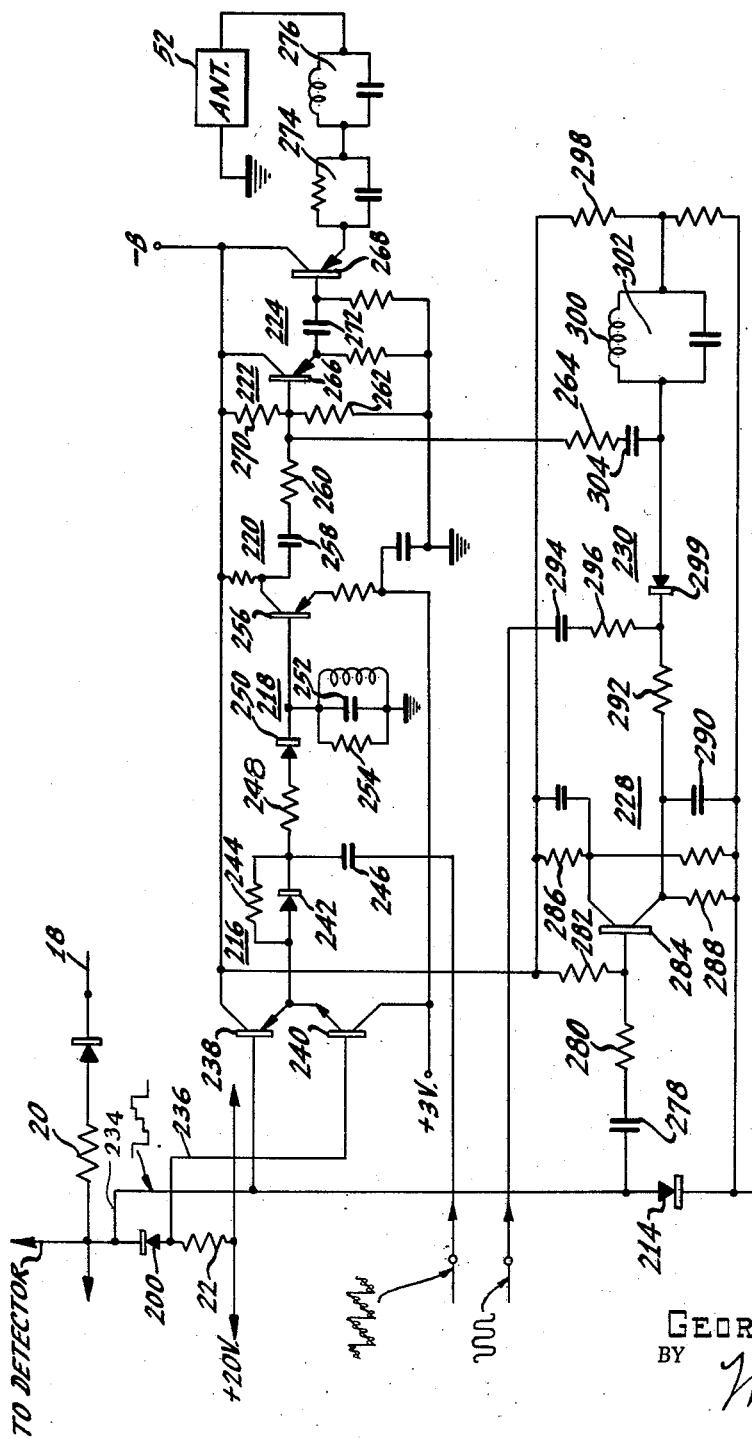

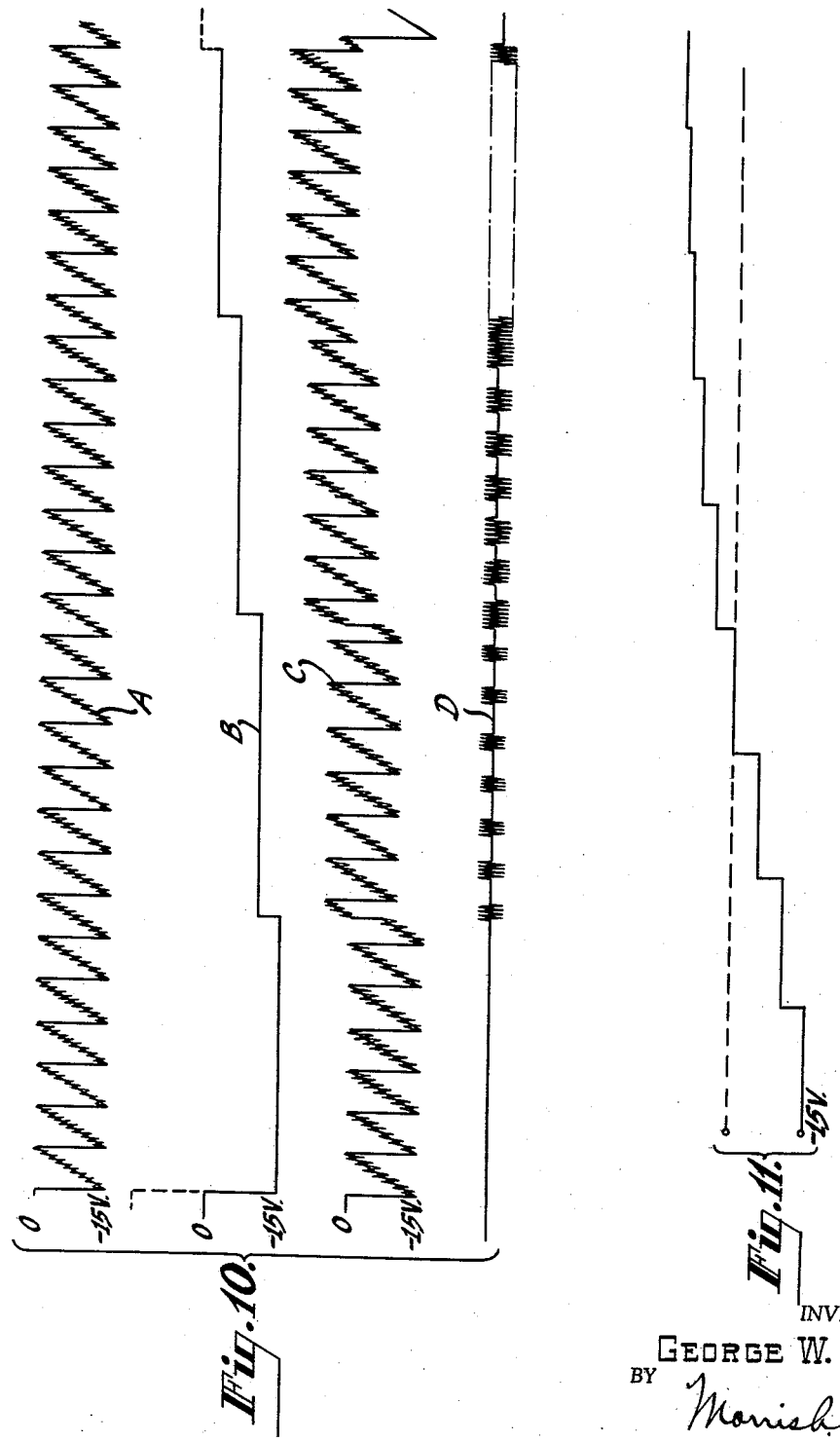

Feb. 26, 1963　　　G. W. GRAY　　　3,078,944
VEHICLE CONTROL SYSTEMS
Filed April 28, 1960　　　　　　　　　　　　8 Sheets-Sheet 7
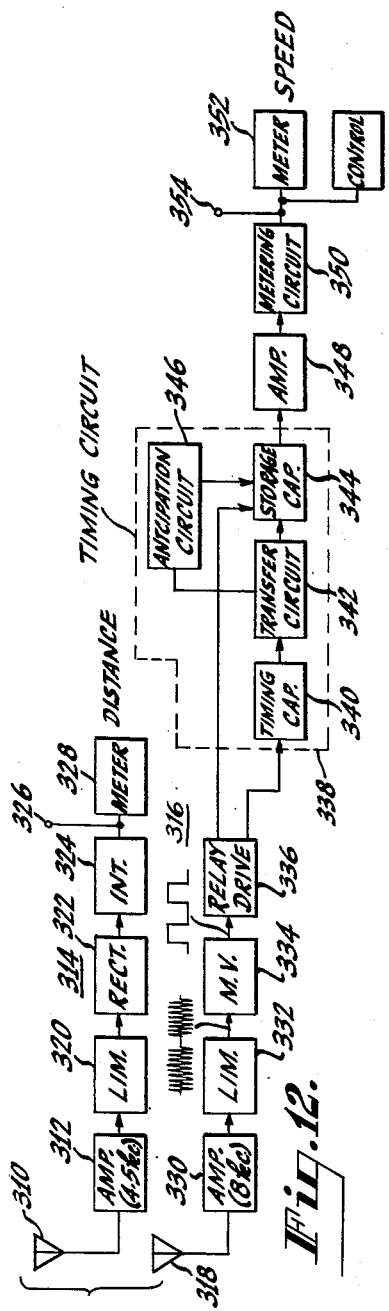
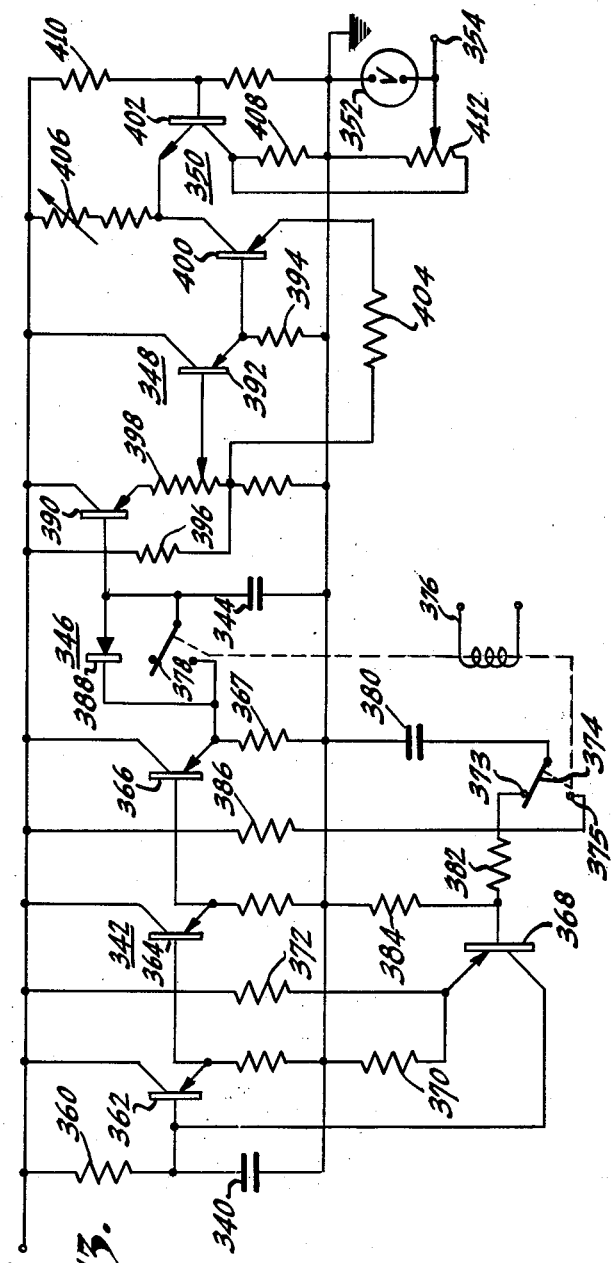
INVENTOR.
GEORGE W. GRAY
BY
ATTORNEY United States Patent Office 3,078,944
Patented Feb. 26, 1963

3,078,944
VEHICLE CONTROL SYSTEMS
George W. Gray, Lambertville, N.J., assignor to Radio Corporation of America, a corporation of Delaware
Filed Apr. 28, 1960, Ser. No. 25,443
47 Claims. (Cl. 180—82)

The present invention relates to vehicle control systems, and more particularly to electronic systems for transmitting warning or control signals to vehicles as they travel along a highway and for receiving such signals in these vehicles so as to increase highway safety.

The invention is especially suitable in providing an automatic control system of the type disclosed in Zworykin, Flory and Pike United States Patent No. 2,847,080, issued August 12, 1958, wherein means are provided along a highway which are actuated behind a vehicle traveling on the highway to create a "tail" of warning or control signals. The system of the present invention provides improved means for generating, transmitting and receiving a tail of warning or control signals.

Although the invention is especially suitable in providing safer and automatic driving for road vehicles such as automobiles, trucks, buses, and the like, features of the invention may be useful in control, warning or guidance of aircraft, ships and missiles, for example. Thus the term "vehicle," as used herein, is intended to embrace, generally, driven equipment of any sort which moves along a path.

It is an object of the present invention to provide an improved system for the control of vehicles which travel along a highway or other path.

It is another object of the present invention to provide an improved system for generating and transmitting warning or control signals to vehicles which travel along a path, as on a highway.

It is a further object of the present invention to provide an improved system for signaling between vehicles which follow one another along a path information as to the distance separating the vehicles and as to the speed thereof.

It is a still further object of the present invention to provide an improved system for generating a tail of control or warning signals along a highway in response to the passage of a vehicle.

It is a still further object of the present invention to provide an improved control system for vehicles by means of which the vehicles can be caused to maintain a safe distance of separation, which distance can be changed for accommodation to various road conditions, such as rain, snow, ice, fog, and the like.

It is a still further object of the present invention to provide an improved control system for vehicles which is generally fail-safe in its operation in transmitting and receiving warning or control signals.

It is a still further object of the present invention to provide an improved electronic system suitable for vehicle control and warning purposes which is more stable in operation than prior electronic systems for vehicle control and warning.

It is a still further object of the present invention to provide an improved system for signaling among vehicles which travel along a highway in which the need for a reference signal is eliminated.

It is a still further object of the present invention to provide an improved system for transmitting and receiving signals corresponding to the speed of a vehicle as it travels along a highway.

Briefly described, a vehicle control system provided in accordance with the present invention utilizes detecting means disposed at spaced locations along a highway for detecting the presence of vehicles on the highway. Signal generating and propagating means are also provided. These signal generating and propagating means are operative to transmit control and/or warning signals along the highway. The signal generating and propagating means are responsive to the detecting means and transmit, between pairs of successive vehicles, tails of control and/or warning signals related to the distance between the pairs of successive vehicles and the speed of the leading vehicles in each of the pairs of successive vehicles.

The detecting means are also operative to provide control voltages. The detecting means and the signal generating and propagating means are connected in a manner such that the control voltages are of different amplitudes depending upon the distance between the signal generating and propagating means and the vehicle which actuates the detecting means.

A plurality of detecting means may be provided together with a plurality of signal generating and propagating means. Each detecting means provides a control voltage in response to the presence of the vehicle. The detecting means and the signal generating and propagating means are connected in a manner to actuate a number of signal generating and propagating means with control voltages of different amplitudes depending upon the distance between the signal generating and propagating means and the detecting means which is actauted by a vehicle. The signal generating and propagating means are operative in response to the control voltages to provide the tails of control and/or warning signals.

Further in accordance with the present invention, the signal generating and propagating means includes means for providing a repetitive signal varying in duration or duty cycle in accordance with the amplitude of the signal applied from the detecting means to the generating means. This repetitive signal is referred to hereinafter, at times, as the distance signal.

More particularly, there may be produced in the signal generating and propagating means a repetitive wave which has a form depending upon road conditions in the section of the highway in which the system provided by the invention is to be used. This wave is compared with the control voltages from the detecting means and a portion of the wave is propagated which varies in duration or duty cycle in accordance with the amplitude of the control voltages from the detecting means.

By changing the wave form of the control voltage, its duration, or other characteristics thereof, the nature of a control or warning signal which is propagated down the highway to following vehicles is controlled in accordance with road conditions at the particular time. Moreover, the system of signaling provided in accordance with the present invention is more stable than previous electronic systems wherein amplitude information may be transmitted directly.

Further in accordance with the present invention, means are provided for transmitting information as to the speed of a vehicle as it travels down the highway. The signal representing the speed is referred to hereinafter, at times, as the speed signal. Means are provided responsive to the actuation of each detecting means for operating a number of signal generating means to produce an impulse when a vehicle actuates any detecting means. Impulses will be produced in succession at a rate determined by the vehicle's speed. The signal generating means may include means for detecting the variations in amplitude of the control voltages from the successive vehicle actuated detecting means. As the vehicle travels along the highway past the location of each detecting means, the amplitude of the control voltage applied to each of the generating and propagating means will vary in steps. It will be recognized that the vehicle moves a distance equal to the separation of the detecting means upon occurrence of each amplitude step. Thus, the signal generating means is operated to transmit a series of impulses which vary in repetition rate depending upon the speed of the vehicle initiated impulses.

A signal receiver may be provided in the vehicles which travel along the highway for responding to the distance signals and the speed signals from the signal generators. These receivers are fail-safe in operation and include indicating means which indicate a danger condition upon the failure of any component in either the signal generating or signal receiving portions of the system.

The invention itself, both as to its organization and method of operation, as well as the foregoing and other objects and advantages thereof, will become more readily apparent from a reading of the following description in connection with the accompanying drawings in which:

FIGURE 4 is a series of waveforms of signals appearing in the systems and circuits shown in FIGS. 1, 2 and 3;

FIGURE 5 is another series of waveforms of signals appearing in the signal generating means shown in FIGS. 2 and 3 and representing a mode of operation of the illustrated systems and circuits provided by the invention;

FIGURE 8 is a partially schematic, partially block diagram of a system for generating a tail of signals along a highway in accordance with another embodiment of the invention;

FIGURE 9 is a circuit diagram of a part of the system shown in FIG. 8;

FIGURE 10 is a series of waveforms of signals appearing in the system and circuit shown in FIGS. 8 and 9;

FIGURE 11 is a waveform diagram of a signal appearing in the system shown in FIG. 8, the waveform being depicted in a manner to illustrate a mode of operation of the system according to the present invention;

FIGURE 12 is a block diagram of the system of a receiver which may be installed in a vehicle for the purpose of receiving control and warning signals transmitted by the transmitting system shown in FIG. 8;

FIGURE 13 is a more detailed circuit diagram of a portion of the receiver system shown in FIG. 12;

Figure 1:
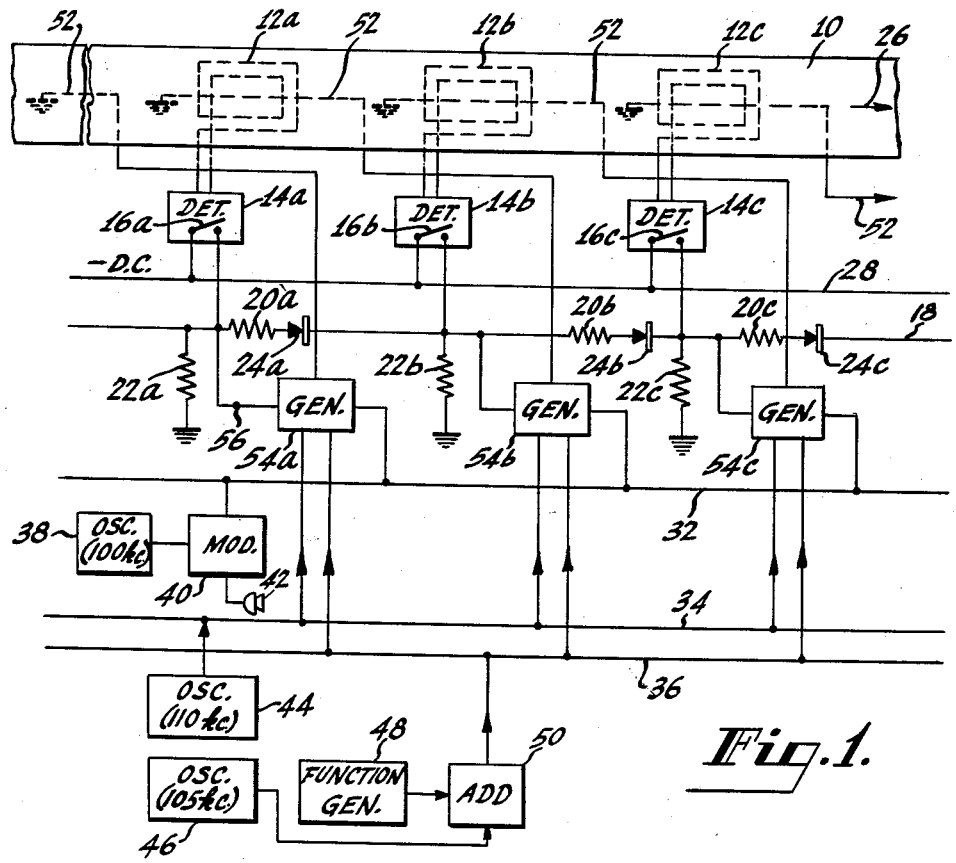
FIGURE 1 is a partially schematic, partially block diagram of signal transmitting apparatus in a system provided in accordance with the present invention.

Referring to FIG. 1 of the drawings, a portion of a highway 10 is depicted. This portion may, for example, be one lane of a multi-lane highway, such as one of the modern turnpikes. In driving an automobile on such highways, the driver usually must stay in a selected lane and hold his speed within close limits. Thus, vehicles usually follow one another rather closely as they travel along the highway. A common accident on modern highways is, therefore, the rear-end collision. Sometimes, one or more vehicles which follow each other along the highway collide with each other in what is commonly referred to as a "chain" collision.

In highways equipped with a system of the type provided by the present invention, electronic control or warning signals are transmitted along the highways and are received by the vehicles traveling along the highway. The drivers are thus warned of a dangerous condition, or their vehicles are automatically slowed down. Chain collisions and other types of rear-end collisions are thereby reduced or eliminated.

In the illustrated system, a plurality of loops or coils 12 are spaced from each other along the highway. Although the loops 12 are illustrated spaced somewhat apart, they may, in practice, be placed in adjacent blocks. These blocks may be of various lengths depending on the expected speed of the vehicles and the cost of the system. Blocks approximately 20 feet long may be found suitable. The loop in each block may extend almost to the limits of its block. The loops 12 are desirably buried just below the road surface of the highway. The loops 12 and other components of the illustrated system are further identified with subscripts which will enter into a discussion of the operation of the system appearing hereinafter.

The loops 12 are each coupled to separate detecting circuits 14. These detecting circuits 14 may be referred to hereinafter as detectors. The detectors 14 are illustrated as blocks including switches 16. The detectors 14 are essentially phase or impedance sensitive circuits. A preferred type of detector is illustrated and described in a copending patent application filed in the name of the present inventor, Serial No. 693,763, filed October 31, 1957, now Patent No. 2,983,852, issued May 9, 1961. This detector includes a phase shifting network in which the detecting loop (such as any of the loops 12) is a phase-shift producing element. The change in inductance of the loop 12, as the vehicle passes over the loop, produces a phase shift which may be detected as an output pulse having a sense and magnitude which is a function of the sense and magnitude of the change in the impedance of the loop from its quiescent value. This output pulse is adapted to operate a relay circuit in which the switch 16 may be provided by a set of relay contacts.

More particularly, the detector includes an oscillator which produces a continuous wave oscillation at several hundred kilocycles per second. A phase detector and a phase shifting network is also provided. This network includes the detecting loop. The signals from the oscillator are applied to the phase detector and to the phase shifting network. The phase shifting network is also coupled to the phase detector. The phase detector is coupled through a coupling circuit to a relay circuit. The relay circuit may include a relay driving amplifier stage.

When a vehicle passes over the detecting coil or loop, an output pulse is produced by a phase detector. This output pulse operates the relay circuit. Accordingly, the relay contacts are actuated, as by being closed, upon sensing of a vehicle. The contacts remain closed so long as the vehicle remains over the loop. Thus, the contacts will be closed for a period determined by the speed of the vehicle. In the event that a vehicle is stalled over a loop, the contacts 16 (FIG. 1) of the detector associated with the loop will remain closed until the vehicle is removed.

A voltage attenuating transmission line 18 is disposed along the highway and interconnects the detecting circuits 14. The voltage transmission line 18 includes sections having series resistors 20 and shunt resistors 22. The shunt resistors are connected to the series resistors and to a point of reference potential, such as ground. Diodes 24 are connected between adjacent ones of the detecting circuits 14 and in series with the series resistors 20. The values of the series resistors 20 may be the same, and similarly the values of the shunt resistors 22 may be the same. Thus, the attenuation in each section is equal.

A direct current transmission line 28 extends along the highway 10, as, for example, at the roadside. A source of negative direct current voltage indicated at −D.C., may be applied to this transmission line 28. The high potential side of this negative direct current voltage source may be connected to the reference potential point which is illustrated as ground. The switches 16 are connected to the direct current transmission line 28 and to the junction of the series and shunt resistors 20 and 22 of the voltage attenuating transmission line 18. When any of the switches 16 closes, a control voltage from the line 28 is applied to the voltage attenuating transmission line 18. This voltage is negative with respect to ground. As will become apparent, the direct current voltage established by the detectors on the attenuating transmission line 18 has amplitude characteristics which are indicative of the distance along the highway between a vehicle and any block, as well as of the speed of a vehicle. Thus, this direct current voltage may be availed of, and will be hereinafter referred to, as a control voltage.

The transmission line 18 transmits the negative control voltage in a direction opposite to the direction of travel of the vehicles along the highway. The direction of travel of the vehicles is indicated by the arrow 26 on the highway 10. The direction of current transmission is established by the polarization of the diodes 24. It will be noted that the transmission line 18 is adapted to transmit current in a direction opposite to the direction of travel of the vehicles along the highway 10.

Three other signal transmission lines 32, 34, and 36 are provided which are adapted to transmit high frequency alternating current signals. Voice modulated signals are adapted to be applied to the signal transmission line 32. An oscillator 38 operating, for example, at one-hundred kilocycles (kc.) is coupled to a modulator 40. The output of the modulator is connected to the line 32. Voice signals from a microphone 42 are applied to the modulator 40. The one-hundred kilocycle oscillators act as a carrier. Highway officials may, desirably, use the microphone to transmit messages of interest, such as those relating to the conditions of the road several miles ahead, to the vehicles passing along the section of the highway 10.

Another oscillator 44 which operates at a frequency above the frequency of oscillation of the oscillator 38 (for example, one hundred and ten kilocycles) is coupled to another of the signal transmission lines, such as the line 34. The oscillations from the oscillator 44 are used to transmit information as to the speed of the vehicles passing along the highway 10, as will be explained more fully hereinafter.

Another oscillator 46, which operates at a frequency different from the frequencies of oscillation of the oscillators 38 and 44 (for example, one hundred and five kilocycles) cooperates with a function generator 48 to provide signals of special waveform for application to the third signal transmission line 36. The function generator 49, in the system illustrated in FIG. 1, generates a step-wave which is repetitive at a frequency much lower than the frequency of operation of the oscillator 46. A suitable frequency may be in the range of 100 to 200 cycles per second. While the function generator 48 is described herein in connection with the embodiment of the invention shown in FIG. 1 as a step wave generator, it may, as will be explained more fully hereinafter, be adapted to generate other waveforms such as triangular, sawtooth or exponential waves.

The waveform generator may be of any conventional design. The design of generators of special waveforms is known in the art and is described in the textbook entitled "Waveforms" by Chance et al. (M.I.T. Radiation Laboratory Series—McGraw-Hill Book Company, 1949). The oscillations from the oscillator 46 are additively combined with the wave from the function generator in an adding circuit 50. This adding circuit 50 may be a resistive adding network, as will be described in detail hereinafter. The output of the adding circuit is connected to the signal transmission line 36.

The signal transmission lines 32, 34 and 36 serve a section of the highway. The length of the section of the highway served by the same group of oscillators and associated circuits will depend upon the signal transmission characteristics of the lines 32, 34 and 36. It may be desired to use different function generators in different sections of a highway depending upon the types of road sections, such as curves, hills, and straight sections. Accordingly, the signal transmission line 36 may serve a longer or shorter section of the highway than the other transmission lines 32 and 34.

Different antennas 52 are associated with different blocks along the highway. In other words, the antennas correspond in number and location to the detecting loops 12. The antennas 52 are grounded at one end and are adapted to radiate energy primarily by induction. Accordingly, the radiation field of each antenna is limited approximately to the block of the highway in which the antenna is disposed. The antennas may be located, in practice, along the roadside rather than along the center of the road, as illustrated in the drawing.

The antennas are fed by signals from signal generating networks 54. These networks may be referred to hereinafter simply as generators 54. The generators 54 are connected to the signal transmission lines 32, 34 and 36 and to the voltage transmission line 18. Connections are made from associated detectors 14 and generators 54 to different sections of the transmission line 18 at the junctions of different pairs of series and shunt resistors 20 and 22. It will be observed that each generator 54 is connected to the antenna 52 associated with the block immediately preceding the block containing the loop 12 of its associated detector 14.

Each of the generators 54 is operative in response to control voltages from its associated detector and from the line 18, and to signals from the signal transmission lines 32, 34 and 36. Each generator 54 is adapted to produce control and warning signals for transmission by its antenna 52. These control and warning signals have characteristics determined and ascertained by the control voltages from the detectors due to the distance between vehicles on the highway and vehicle speed. However, the signals produced by the generators and radiated by the antennas are in a form most suitable for accurate transmission and reception of warning and control information by the vehicles as they travel along the highway. The details of the generators 54 are discussed below in connection with FIGS. 2 and 3 of the drawing.

As a vehicle passes over a particular loop 12, the switch 16 of the detector 14 associated with the loop will close for the time interval that the vehicle is present on the loop 12. To clarify the following discussion, the various sensing loops, detecting circuits 14 and generators 54 are identified by letter subscripts in accordance with the letters in the alphabet. Thus, as a vehicle travels along the highway 10, it will pass over the loops 12a, 12b and 12c in succession. The detector 14a is first actuated and the switch 16a is closed. A negative control voltage is applied from the line 28 to the generator 54a.

The vehicle then passes over the second loop 12b. The switch 16a in the detecting circuit 14a opens and the switch 16b in the detecting circuit 14b closes. A voltage from the line 28 is applied to the generator 54b. A control voltage will appear across the shunt resistor 22b in the transmission line 18 which is effectively connected across the control voltage input of the generating network 54b. Some of the voltage across the shunt resistor 22b appears across the first resistor 22a which is, similarly with the resistor 22b, connected across the control voltage input of the generating network 54a. The amplitude of the control voltage across the first shunt resistor 22a is determined by the values of the resistors 20a and 22a and the forward resistance of the diodes 24 in the line 18. Thus, a voltage will appear across the resistor 22a, when the vehicle passes over the detecting loop 12b, which is a predetermined fraction of the voltage which appeared across the resistor 22a when the vehicle passed over the detecting loop 12a.

As the vehicle proceeds down the highway, it passes over the detecting loop 12c. The switch 16b opens and the switch 16c closes. A control voltage equal in magnitude to the voltage which was applied to the generating networks 54a, 54b when the vehicle passed over the detecting loops 12a, 12b now appears across the shunt resistor 22c. A predetermined fraction of this voltage is transmitted through the voltage transmission line 18 and appears across the resistor 22b. A still smaller fraction of this voltage appears across the resistor 22a. Accordingly, the control voltage at the inputs of the generators 54a, 54b, 54c will therefore vary in steps as the vehicle proceeds down the highway 10. The amplitude of the control voltage at any block on the highway depends on the distance of the vehicle from the block. The width of each step will depend upon the speed of the vehicle. The rate of occurrence of the steps is related to the speed of the vehicle.

Assuming, for example that the vehicle travels about sixty m.p.h., it will pass over each loop in approximately 0.25 second. Because of the action of the diode voltage transmission line 18, the vehicle leaves behind it a tail of control voltages appearing at each of the generators 54a, 54b, and 54c. This tail is preferably adjusted in practice to correspond to a distance of several hundred feet in order to provide sufficient time and distance to bring following vehicles to a stop even though the leading vehicle is stopped. It will be appreciated that any number of detecting loops and their associated circuitry and networks may be employed and that only three are shown to simplify the illustration.

The control voltage applied to each of the generators 54 is compared in the networks thereof with the wave from the function generator 48 and oscillator 46 which is applied to the signal transmission line 36. The generators are therefore operative to convert a control voltage into control and warning signals having certain desired characteristics. These signals are propagated by the antennas 52 for reception in vehicle carried receivers of the type to be described hereinafter. Since the control voltage is related to the distance of the vehicle ahead on the highway and the speed thereof, the control and warning signals will also be related to the distance and speed of the vehicle.

Figure 2:
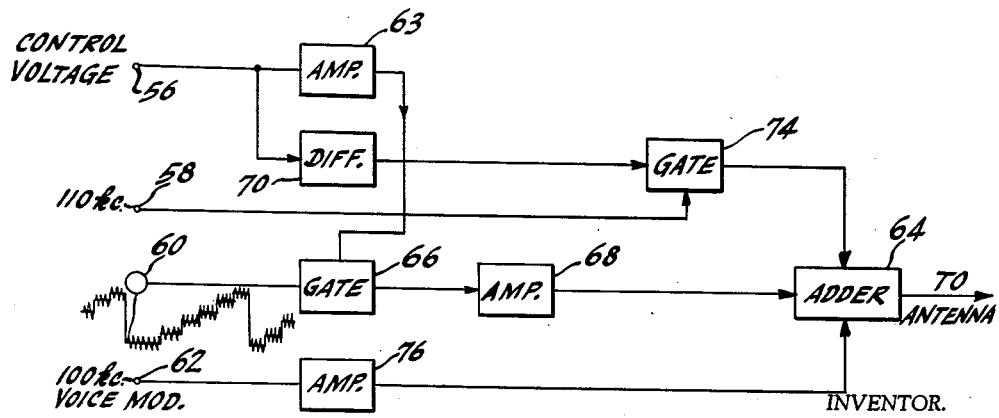
FIGURE 2 is a block diagram of means included in the system shown in FIG. 1 for generating signals indicative of the speed of vehicles passing along a highway and the distance between vehicles.

Referring to FIG. 2, a block diagram of one of the generators 54 is shown. Four input terminals 56, 58, 60 and 62 are indicated in this figure. The control voltage from the detecting networks 14 and diode transmission line 18 is applied to the input terminal 56. The signal transmission line 34 is connected to the input terminal 58 and applies 110 kc. oscillations to the terminal 58. The signal transmission line 36 is connected to the input terminal 60 and applies thereto a step waveform having a 105 kc. signal superimposed thereon as indicated by the waveform shown immediately adjacent the terminal 60. The signal transmission line 32 is connected to the last of the terminals 62 for the application of the voice modulated 100 kc. oscillations to the generator. The generator provides three signals which are combined in an adder circuit 64 for transmission to the antenna 52 associated with the related generating network. These signals are (1) a first control and warning signal indicative of the distance between vehicles, (2) another control or warning signal indicative of the speed of a vehicle, and (3) a voice-modulated signal to carry information of interest.

The generation of the distance control or warning signal will be considered first. The control voltage is applied to an amplifier 63. This amplifier is a direct current amplifier which applies the control voltage to one input of a gate circuit 66. The signals from the function generator are applied to another input of the gate circuit 66. The gate circuit 66 is operative to transmit signals therethrough so long as the signals from the function generator are greater in amplitude than the control voltage, when the amplitudes thereof are measured in the same sense. In the illustrated case, the voltages are measured in the negative sense. Thus, where a first voltage is of greater negative value than another voltage of lesser negative value, the first voltage is considered of greater magnitude than the other.

The output of the gate circuit 66 is applied through an alternating current coupling device (for example, a capacitor) to the input of an amplifier 68. The direct current component of the signal transmitted by the gate circuit 66 is removed due to the capacitive coupling to the amplifier 68. The 105 kc. signal which is superimposed on the signal from the function generator is therefore transmitted by the amplifier 68 to the adder 64, so long as the amplitude of the signal from the function generator is greater, in the same sense, than the amplitude of the control voltage.

The amplitude relationships of the signals will be more apparent from FIG. 4 of the drawings. The step wave signal from the function generator is shown as waveform *a* having 105 kc. oscillations superimposed thereon. The control voltage, shown in waveform *b*, is also a step wave. As indicated above, this control voltage is negative with respect to ground as measured at the input terminal 56 of the generator 54. Negative going voltages are selected for the control voltage and for the voltage wave generated by the function generator in view of the characteristics of the circuitry in the generator 54. It will be pointed out hereinafter that the circuits in the generator 54 are transistorized. It is desirable to use P-N-P transistors, since they are more readily available. Since these transistors are operated with negative signals, the control voltages are generated from a negative source in order to accommodate these transistors. It will be appreciated that vacuum tube circuits and other types of transistors may be used in the system provided by the invention. Where electron tubes are employed, it would be desirable to generate control voltages and waves which increase in a positive sense rather than in the negative sense as in the case illustrated above.

The wave from the function generator is desirably of such frequency that several cycles of the step wave occur during each step of the control voltage. In the case of a vehicle traveling 100 miles per hour, which is higher than would be expected even on a high-speed turnpike, each step of the control voltage shown in the waveform *b* of FIG. 4 would be approximately $\frac{1}{7}$ of a second. Accordingly, it is desirable for several cycles of the function to occur within the period of one step of the control voltage wave. Fewer cycles of the step wave from the function generator than may appear in practice are shown occurring during each of the steps in the control voltage in FIG. 4 to simplify the drawing of the waveforms.

As the vehicle travels away from the loop of the detector coupled directly to the generator shown in FIG. 2, the control voltage, waveform *b*, decreases in steps, each step corresponding to a passage over a successive one of the blocks. It will be observed that the wave *a* and control voltage wave *b* are of equal amplitude. The height of each step in the control voltage *b* is equal to the height of each step in the step wave *a*. The first step in time occurs when the vehicle passes over the loop of the detector 14 which is directly coupled to the generator of FIG. 2. It will be recalled that the gate 66 transmits the step wave when the step wave is greater in amplitude than the control voltage. Because of the amplitude relations of the waves *a* and *b*, the step wave *a* is blocked during the period that the vehicle passes over the block containing the loop of the detector which is directly coupled to the generator shown in FIG. 2.

When the vehicle proceeds to the next adjacent block, the first and greatest amplitude step of the control voltage wave $b$ is transmitted. When the vehicle reaches the third block, two steps of the step wave $a$ are transmitted. Finally, as the control voltage decreases to approximately "zero" volts, or ground potential, three steps of the step wave $b$ are transmitted.

The direct current component of the signal is eliminated in the circuit which couples the gate 66 to the amplifier 68. Thus, only bursts of oscillations of 105 kc. are amplified by the amplifier 66 and applied to the adder 64 for application to the antenna 52. These bursts of signals are shown in waveform $c$ of FIG. 4. It will be noted that since the steps in each staircase in the step wave $a$ and the steps in the control voltage $b$ are of equal amplitude, only the duty cycle of the bursts will vary. The duty cycle will be 100 percent when the duration of each burst equals the period of a cycle of the step wave. The duty cycle is zero percent when the control voltage and step wave are of equal amplitudes. When the vehicle speeds up or slows down, the duty cycle will not vary. However, bursts of the same duty cycle will be available for a longer period of time.

Thus, it will be seen that the control voltage due to the passage of vehicles along the highway is translated or converted from a representation of distance separating vehicles, in terms of amplitude, to a representation of distance separating vehicles, in terms of signal duration. In other words, the duration of the signal, such as represented by waveform $c$ in FIG. 4, varies from a minimum of a predetermined maximum in accordance with the distance separating successive pairs of vehicles. The longer the duration of the signal, the farther apart are the vehicles.

The system provided by the invention therefore has certain advantages. The system is more stable than previous systems in which the amplitude of a control voltage was the significant characteristic of the transmitted signal. Ambient conditions and variations of circuit characteristics as the circuit components age which might alter the signal amplitude do not adversely affect the system provided by the present invention. Moreover, no reference signals need be transmitted. In addition, the system provided by the present invention is more flexible in its use.

FIGURE 5 shows a series of waveforms which indicate how the system may be controlled or adjusted to accommodate changing road conditions. Under ordinary circumstances, a certain safe separating distance will be acceptable. However, when the highway becomes wet, icy, or covered with snow, for example, the minimum safe separation distance is desirably increased. This can be accomplished with the present invention by somewhat changing the waveform generated by the function generator. Waveform $a$ in FIG. 5 represents the output of the function generator. The 105 kc. signal is not shown in FIG. 5 to simplify the illustration. It will be observed in FIG. 5a that the two top steps of each of the cycles of the waveform are approximately one-half as wide as the other step. A control voltage generated by a vehicle traveling at a uniform speed is portrayed in waveform $b$ in FIG. 5. Upon application of waveforms $a$ and $b$ of FIG. 5 to the gate circuit 66, output signal bursts are provided after removal of the direct current component, as shown in waveform $c$ of FIG. 5. It will be observed that signal bursts of longer duration are produced later in time in waveform $c$ of FIG. 5 than in waveform $c$ of FIG. 4. Since steps of the wave $a$ have been purposely made of shorter than normal duration, control and warning signals of longer duty cycle are generated later in time than usual. This indicates that the distance between the vehicles is shorter than is actually the case. However, this is desirable when the road conditions are dangerous.

The vehicles traveling along the highway are equipped with receivers which respond to the duration of the transmitted control or warning signal. The receivers will be described in detail hereinafter. The receivers respond by indicating the distance separating the vehicles or by automatically controlling the braking system of the vehicles. Since a signal or shorter duration and duty cycle is produced when there is a longer distance between vehicles than under normal conditions, the following vehicle will slow down sooner and maintain a greater distance behind the car ahead. Thus, under slippery road conditions, the vehicles may be kept farther apart than under dry or normal road conditions.

Signals are obtained in the generator shown in FIG. 2 from the control voltage representing the speed of the vehicles traveling along the highway. The control voltage is applied to a differentiating circuit 70. The differentiated control voltage output from the differentiating circuit 70 is in the form of a series of pulses. These pulses are amplified in an amplifier and applied to a gate circuit 74. The 110 kc. oscillations from the signal transmission line 34 are also applied to the gate circuit 74. The differentiated control voltage therefore serves to gate the 110 kc. oscillations so that bursts of 110 kc. oscillations are transmitted upon occurrence of the pulses from the differentiating circuit 70. These bursts are applied to the adder network 64 for application to the antenna.

Referring to FIG. 4 again, waveform $e$ thereof illustrates the output of the differentiating circuit 70. The negative-going pulse is produced on the descending portion of the control voltage. Positive pulses are reproduced at the beginning of each step of the control voltage. The negative-going pulse does not contain any useful speed information and is suppressed by components of the system which will be described in connection with FIG. 3 of the drawing. Each of the positive pulses of the differentiated control voltage is produced after the vehicle has moved the length of a block (i.e., twenty feet in an exemplary case) along the highway in which different detecting loops are located. The number of positive pulses in the differentiated output produced for a given period of time is therefore an indication of the speed of the vehicle. These voltage pulses gate the 110 kc. oscillations in the gate circuit 54 so that bursts of 110 kc. oscillations are transmitted as warning and control signals which represent the speed of a vehicle to a succeeding vehicle traveling along on the highway.

The bursts of 110 kc. oscillations are used in the receiver of the following vehicle to ascertain and indicate the speed of the vehicle ahead of the following vehicle on the highway and for warning and/or control purposes.

The voice modulated signals are amplified in an amplifier 76 and applied to the adder circuit 64 for transmission by the antenna 52 associated with the generator 54, as illustrated in FIG. 2 of the drawings. It will be noticed that the speed signals are bursts of 110 kc. oscillations. The distance signals are bursts of 105 kc. oscillations and the voice modulated signals are transmitted on a 100 kc. carrier. Each control signal is therefore in a different frequency band so that the various signals can be separated in the receiver, as will be explained hereinafter.

Figure 3:
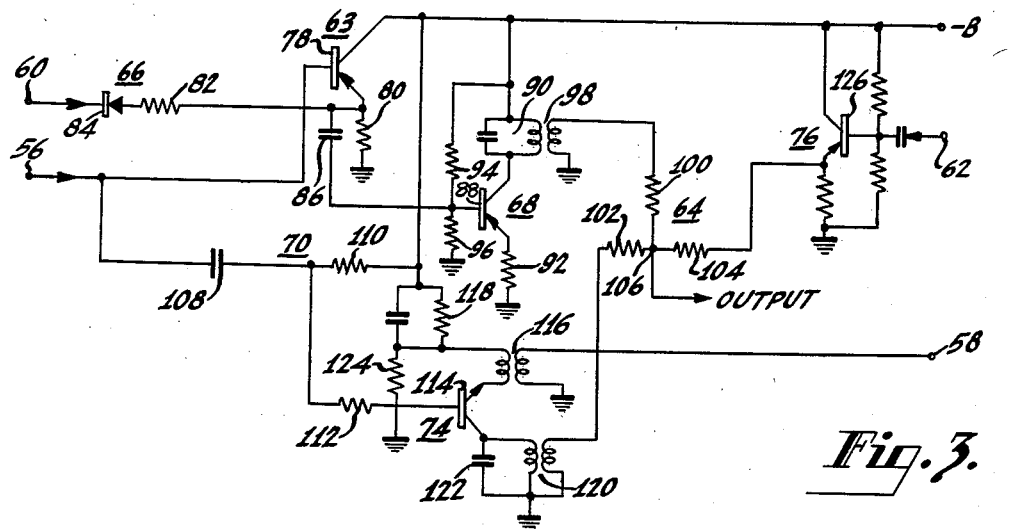
FIGURE 3 is a detailed circuit diagram of the signal generating means shown in FIG. 2.

Referring to FIG. 3, it will be seen that the circuit elements and components of the generating network shown in FIG. 2 are illustrated as semiconductor circuits. It will be appreciated, however, that the principles of the invention may be applied to circuits using other types of amplifying devices and unilateral conductive devices, such as electron tubes.

The control voltage from the highway is applied to a transistor stage providing the amplifier 63 which is connected in an emitter-follower circuit. This amplifier includes a type P-N-P transistor 78. The emitter of this transistor 78 is connected through a resistor 80 to the point of reference potential (ground). The collector is connected to a source of energizing potential which, in the case of P-N-P transistors, is a negative voltage source indicated as —B. The base of the transistor 78 is connected to the input terminal 56 so that the control voltages from the highway are applied to the base of the transistor. Since the transistor 78 operates as an emitter-follower, these control voltages appear across the emitter resistor 80. The emitter resistor 80 is connected through a resistor 82 to a diode 84 which constitutes the gate circuit 66. The diode 84 acts as a gate since current passes through the diode only when the voltage across the resistor 80 is more positive than the voltage at the input terminal 60. The step wave from the function generator to which 105 kc. oscillations are added is applied to the input terminal 56. It follows that the diode gate circuit 66 functions to block the transmission of the signals from the function generator, when the control voltage is greater in amplitude in the same sense (negative in the illustrated case) than the step wave from the function generator 48 (FIG. 1).

The current transmitted through the diode circuit 66 when the diode 84 conducts results in a voltage drop across the emitter-resistor 80. A coupling capacitor 86 is connected to the base of a transistor 88 which is included in the amplifier stage 68. This capacitor 86 removes the direct current component from the current passed by the diode gate 66. Accordingly, a waveform similar to the waveform c shown in FIG. 4 is applied to the input of the amplifier 68.

The amplifier 68 includes a P-N-P transistor 88 having a tank circuit 90 tuned to 105 kc. The tank circuit 90 is connected to the collector of the transistor 88. The tank circuit is also connected to the source of operating voltage —B and provides a path for operating current for the transistor 88. The emitter is connected to ground through a self-biasing resistor 92. A biasing network including two resistors 94 and 96 is connected, at the junction of these resistors, to the base of the transistor 88. The coil in the tank circuit 90 constitutes the primary of a coupling transformer 98. The secondary of this coupling transformer is coupled to the adder circuit 64.

The adder circuit 64 is provided by three resistors 100, 102 and 104 connected to a common junction point 106. The sum or total of the voltages applied to each of the resistors is obtained at this junction 106, and this total voltage provides the output of the generator. This output may be connected to the antenna through suitable coupling circuits (not shown). It will be recalled that the antennas 52 are connected to ground to complete the output circuit of the adder. Accordingly, bursts of 105 kc. varying in duration corresponding to the distance of a vehicle on the highway from the generator are transmitted as a control and warning signal after amplification in the amplifier 68. These 105 kc. bursts are transmitted together with other signals combined in the adder 64.

The control voltage from the highway is also applied to a differentiating circuit 70 in order to obtain the speed control and warning signals. This differentiating circuit includes a capacitor 108 and a resistance provided primarily by a resistor 110 which is connected from the capacitor 108 to ground through the source of negative voltage at —B, which source is, of course, grounded. A resistor 112 couples the differentiating circuit 70 to the input of the gate circuit 74. This resistor 112 has a high value of resistance, for example 10 kilohms.

The gate circuit 74 is provided by a type N-P-N transistor 114. The emitter of this transistor is connected to the secondary winding of a coupling transformer 116 and, through a by-pass resistor 118, to the source of operating potential at —B. The collector of the transistor 114 is connected to ground through a tank circuit including the primary winding of a coupling transformer 120 and a capacitor 122. This tank circuit is tuned to 110 kc. The resistor 118 is connected to ground through a resistor 124. The resistors 118 and 124 set the operating voltage on the emitter of the transistor 114.

The 110 kc. oscillations are applied to the terminal 58. The terminal 58 is connected to the secondary winding of the coupling transformer 116 and provides one input to the gate circuit 74. The output of the gate circuit 74 is obtained from the secondary of the other coupling transformer 120. This secondary is connected to the resistor 102 in the adder 64.

The differentiated pulses produced by the differentiating circuit 70 are applied to the base of the transistor 114. The transistor 114 is operated normally cut off by virtue of the potential applied to its emitter through the voltage divider comprising the resistor 118 and the resistor 124. It is a well known characteristic of N-P-N transistors that they are rendered conductive in their collector-to-emitter path when a positive voltage is applied to their base. Accordingly, negative pulses such as result from differentiation of the first step of the control voltages, as shown in waveform e in FIG. 4, are automatically suppressed in the circuit. The resistor 112 drops the voltage due to the negative pulses to a low amplitude and thereby insures that the pulses will not be of sufficient amplitude to damage the transistor 114. The positive pulses are, however, sufficient to render the transistor 114 conductive from emitter to collector. Accordingly, the 110 kc. oscillations applied to the emitter are transmitted in bursts through the transistor to the transformer 116 and are coupled to the adder circuit 64. These bursts of 110 kc. provide the control or warning signal indicative of the speed of the vehicles on the highway.

The voice modulated 110 kc. carrier is applied to the input terminal 62. The input terminal 62 is connected to a substantially conventional P-N-P transistor amplifier 76, which is connected as a biased emitter-follower. The amplifier 76 includes a transistor 126. The emitter of the transistor 126 is connected to the adder circuit through the resistor 104 thereof. Accordingly, the distance signal, speed signal and the voice modulated signal may be simultaneously propagated by the antennas 52.

Figure 6:
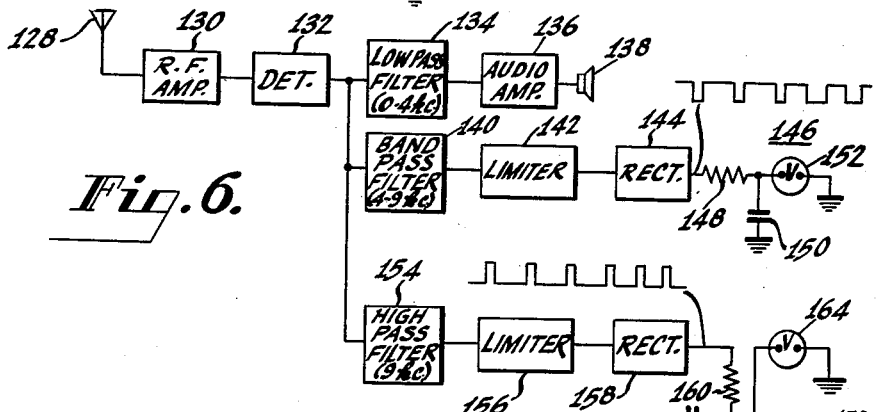
FIGURE 6 is a block diagram of a receiver according to the present invention.

A receiver which may be installed in vehicles which travel along the highway 10 is shown in FIG. 6 of the drawings in block form. A receiving antenna 128 is connected to a radio frequency amplifier 130. The output of the radio frequency amplifier is detected in a detector circuit 132 which removes the audio frequency components of the signal. In other words, the 100 kc. component of the transmitted signals is treated as a carrier, and the lower frequency components which carry the voice signals, the speed signals, and the distance signals are detected and derived as carrier modulating signals. It should be pointed out at this juncture that it is desirable to restrict the frequency range of the voice signals to below 4,000 cycles in order to prevent any possibility of interference with the speed and distance signals.

The signals are applied to a low pass filter 134 which cuts off at approximately 4,000 cycles. This low pass filter passes only the voice signals. The output of the low pass filter is amplified in an audio amplifier 136 and applied to a loud speaker 138.

The detector also provides signals for a band-pass filter 140 tuned to pass the band of approximately 4,000 to 9,000 cycles. Alternatively, a simple filter tuned to approximately 5,000 cycles may be used. The distance control or warning signals are transmitted by the band-pass filter 140 as pulses of 5,000 cycle oscillations. These pulses are limited in a conventional limiter circuit 142. The limiter circuit removes any amplitude variations due to transmission characteristics. Amplifiers may desirably be inserted before or after the limiter circuit, as desired. The limiter output is applied to a rectifier 144 which may be a bridge type of rectifier. The rectifier 144 converts the bursts of the pulses of 5,000 cycle oscillations into direct current voltage pulses of the type illustrated immediately above the rectifier in FIG. 6 of the drawings. It will be noted that these pulses vary in duration (i.e., duty cycle) in accordance with the distance of the leading vehicle from the vehicle carrying the receiver.

A group of pulses is produced by each generating network 54. This is because the frequency of the waveform from the function generator is much higher than the frequency of the steps of voltage in the control voltage. Since groups of pulses are generated, and since pulses do not vary in duration from pulse to pulse, a conventional integrating circuit 146, constituted of a resistor 148 and a capacitor 150, may be used to derive a voltage which varies in amplitude in accordance with the distance between vehicles. This voltage is shown operating a meter 152 to provide an indication of distance to the driver of the vehicle. This indication should warn the driver to slow down or stop his vehicle. However, a warning system such as lights, counters and the like may be used. Alternatively, the voltage appearing across the capacitor 150 may be used in a servo system of generally conventional design for controlling the brakes of the vehicle and therefore will be operative automatically to stop the vehicle when the vehicle approaches the minimum safe distance behind the vehicle ahead of it.

It will be recalled that the plurality of spaced antennas 52 generates a tail of control or warning signals. These signals will be, when received, bursts of 5,000 cycle oscillations of duration varying to a maximum duration depending upon the distance of the vehicle carrying the receiver from the vehicle ahead of it. As the distance between the vehicles increases, the duration of the 5,000 cycle signals received by the following vehicle will increase. Thus, the absence of control signals indicates that the vehicles are adjacent to each other. More particularly, they will be in adjacent blocks on the highway.

It will be noted that the warning or control signals derived by the receiver decrease in amplitude as the vehicles come closer together on the highway. Thus, in the event of a failure of signal, a warning indication will be provided. This affords fail-safe operation for the system of the invention.

It is, of course, desirable to maintain a separation of at least several blocks. The separation distance will depend upon the speed of the vehicles. Thus, on a turnpike where the vehicles may travel at speeds of 60 miles per hour or higher, the separation distance may be 10 or 15 blocks, so that the cars are separated by at least 200 feet. On slower speed highways, such as in tunnels and on bridges, a smaller separation of just a few blocks may be sufficient. A warning indication or controlled operation is, therefore, provided to indicate when the minimum safe separation distance is achieved. This may be accomplished by flashing of lights or operation of the servo system automatically to apply the brakes.

Conventional servo systems and integrating circuits such as illustrated in FIG. 6 may be used, since the 5,000 cycle bursts vary in duration at a relatively slow rate. Thus, it is an important feature of the invention to provide a suitable frequency relationship between the frequency of occurrence of the steps of the control voltage and the frequency of the waves from the function generator such that the function generator produces waves at a frequency higher than the frequency of the steps in the control voltage.

The signals from the detector are also applied to a high pass filter 154 which passes signals of higher than 9,000 cycles in frequency. Alternatively, a tuned circuit tuned to 10,000 cycles may be used. The speed signals are separated in the filter 154 as bursts of 10,000 cycle oscillations. These bursts are limited in a limiter circuit 156 and rectified in a rectifier 158 which may be a bridge type rectifier. The rectifier 158 is coupled to an integrating circuit including a resistor 160 and a capacitor 162. This integrating circuit desirably has a fairly long time constant of about ten seconds. The output pulses from the rectifier circuit are direct current pulses as indicated by the waveform above the rectifier circuit 158. The speed is indicated on a meter 164. The meter may be calibrated so that it reads speed directly.

In order to indicate the relative speeds of a following vehicle and the vehicle ahead of it, a tachometer generator 166 may be used to provide a voltage indicative of the speed of the following vehicle. The voltage indicative of the speed of the vehicle ahead is obtained from the receiver and appears across the capacitor 162. This signal is applied to a difference amplifier 168 together with the signal from the tachometer generator 166. A meter 170 is connected in the output of the difference amplifier 168 and may be calibrated to read relative speeds of adjacent vehicles. A control servo designated schematically by the block 172 labeled "Control" may be used to control the vehicle to maintain a certain relative speed between it and the vehicle ahead.

Figure 7:
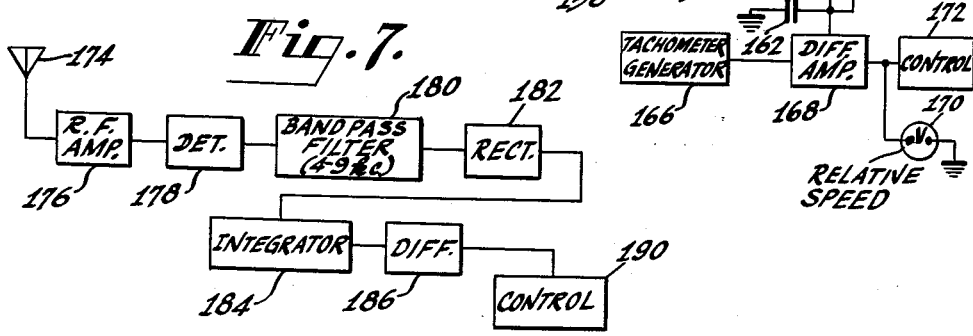
FIGURE 7 is another block diagram showing another embodiment of a receiver according to the present invention.

A modified receiver of lower cost than the receiver shown in FIG. 6 is illustrated in FIG. 7. This receiver includes an antenna 174, a radio-frequency (R.F.) amplifier 176, the detector 178 and a bandpass filter 180. The R.F. amplifier 176, the detector 178 and the bandpass filter 180 may be similar to the R.F. amplifier 130, detector 132 and the bandpass filter 140 (FIG. 6), respectively. A tuned circuit tuned to 5,000 cycles may be used instead of a bandpass filter 180. The output of the bandpass filter is rectified in a rectifier 182 and integrated in an integrating circuit 184. The rectifier and the integrating circuits 182 and 184 may be similar to the rectifier 144 and the integrating circuit 146 (FIG. 6). Thus, a voltage will be developed from the output of the integrator 184 which is a function of the separation between the vehicles. This voltage may be differentiated in a differentiating circuit 186.

The differentiated distance signal is a function of the relative speeds of the leading vehicle and of the following vehicle which is equipped with the receiver shown in FIG. 7. A tachometer generator, as illustrated in FIG. 6, is not used in the system of FIG. 7. The differentiated signal is applied to a control device 190. This control device may be a servo for controlling the acceleration and the braking system of the vehicles so as to maintain the vehicle at a particular speed with respect to the speed of the vehicle ahead of it.

Another embodiment of a system provided in accordance with the present invention is illustrated in FIG. 8 of the drawings. FIG. 8 shows the equipment which may be located in or along the highway for the purpose of generating and transmitting the control and warning signals. The highway is not depicted in FIG. 8 in order to simplify the illustration. The system illustrated in FIG. 8 includes a plurality of detecting loops (not shown in this figure) for sensing the passage of vehicles along the highway. These loops are coupled to detecting circuits or detectors 14. Antennas 52 associated with different of the successive blocks along the highway are also used. A diode voltage transmission (attenuating) line 18 is disposed along the highway for cooperation with the detectors. This diode line 18 includes series resistors 20 which are of equal value and shunt resistors 22 which are also of value equal to each other. The shunt resistors 22 may have a much higher resistance than the series resistors 20. In series with the shunt resistors are additional diodes 200 which cooperate with a clamping circuit as will be described hereinafter. However, the diodes 200 may be omitted when a level setting circuit of a type other than the clamping circuit 216 is used. These diodes 200 are polarized to transmit negative current through the shunt branches of the line 18. Instead of being connected to ground, the shunt resistors are connected to a source of positive voltage which, for purposes of illustration, is designated as being of +20 volts. A direct current transmission line 28 is connected to a source of negative voltage indicated solely for purposes of illustration as being −15 volts. The detectors 14 are connected so that the switches 16 thereof are each between the direct current transmission line 28 and the diode line 18 at the junction of a diode 200 and a series resistor 20.

A signal generator network or generator 202 is also provided. This generator cooperates with the diode line 18 and with a generator 204 of waves of predetermined waveform or which varies in amplitude as a predetermined function of time. This generator 204 is called a function generator herein. The function generator 204 functions to convert the control voltage from the detectors 14 and the diode line 18 into control and warning signals for transmission by the antennas 52. A plurality of the generators 202 may be provided. Each of the generators 202 is associated with a different block of the highway and is connected to a different one of the antennas 52. Two generators 202 are shown in FIG. 8. One of these generators is shown in greater detail than the other in two parts labeled 202a and 202b. A function generator 204 may be connected to a signal transmission line 206 and serves to provide predetermined waveform signals to a number of the generators 202.

The function generator 204 includes a generator 210 of sawtooth waves. It will be understood that other waves such as triangular waves, may be used. This generator 210 may be a conventional Miller or boot strap circuit. The waves are illustrated in waveform A of FIG. 10. The waves increase in a negative sense and vary in magnitude between zero volts and minus fifteen volts. The voltage magnitude of the wave is merely a typical suitable value, indicated herein solely for the purpose of illustration. The waveform A is selected to be of negative polarity to accommodate the use of transistor and semiconductor circuitry in the generator 202. This circuitry is adapted to use type P-N-P transistors, primarily. Type P-N-P transistors are of lower cost and are more generally available at this time.

The function generator 204 also includes an oscillator 208 which, for purposes of illustration, is designated as providing oscillations at 4.5 kc. (4500 cycles). These oscillations are added to the sawtooth waves from a generator 210 in an adding circuit 212. Thus, 4.5 kc. oscillations are superimposed on the sawtooth waves, as illustrated in the waveform A of FIG. 10. The frequency of the sawtooth waves is desirably much greater than the frequency of the steps of the control voltage produced in the diode transmission line 18 for the reasons pointed out above, namely, more stable operation of the transmitting portion of the system provided by the invention and better adaptability to integration in the integrator circuits in the receiver with which the vehicles traveling along the highway may be equipped.

It may also be desirable to synchronize the sawtooth generator 210 with oscillations from the oscillator 208. It is desirable to initiate each cycle of the sawtooth wave at the beginning of a cycle of the 4.5 kc. oscillations. In this manner, the maximum amplitude of the sawtooth wave is not altered. As is apparent from waveform A of FIG. 10, the amplitude of the 4.5 kc. oscillations is much smaller than the amplitude of the sawtooth wave and may, for example, be of about one-half volt peak-to-peak. Synchronizing circuits for sawtooth generators are well-known in the art and may be found in many texts such as the "Waveforms" text referenced above. Accordingly, such circuits will not be described in detail herein.

It will be noted that each junction between a series resistor 20 and its associated diode 200 on the diode transmission line 18 is connected to ground potential through a diode 214 which is polarized to transmit positive current to ground. Thus, the junctions of the respective resistors 20 and diodes 200 cannot rise above ground potential. This circuit arrangement permits utilization of only the more linear portion of the control voltage step wave in the diode line 18 as will be explained more fully below in connection with FIG. 10.

Waveform B of FIG. 10 shows the step wave of control voltage which would be generated at each of the junctions of one of the resistors 20 and the associated diode 200 of the line 18 as a vehicle passes over the loops of the detector connected to these junctions. When the vehicle passes over the loop, the detector switch 16 closes and thus a negative voltage appears across the shunt branch including the diode 200 and shunt resistor 22. Since the D.C. transmission line 28 is negative with respect to ground and since the bottom of the shunt resistor is positive with respect to ground, the voltage across the shunt branch, in the absence of the diode 214 which is connected to ground across that branch, would be the sum of the source voltages which, in the illustrated case, is 35 volts. As the vehicle passes over successive loops as it travels down the highway, the voltage across any of the shunt branches will vary in steps determined by the attenuating characteristics of the line 18. The attenuation in each block of the diode line 18 (constituted of a series and shunt resistor 20 and 22, respectively) is the same. Thus, the steps of voltage gradually decrease in amplitude. This decrease is approximately equal over the first several blocks along the highway. However, as the input voltage to blocks of the line 18 which are somewhat distant from the vehicle decreases, the steps of voltage also decrease and depart from uniformity. The steps of voltage decrease in a somewhat exponential manner.

Waveform B of FIG. 10 shows three steps of approximately uniform height or amplitude and a fourth step of lesser amplitude. It will be appreciated, however, that many more steps are produced in practice before the amplitude of a step decreases from its adjacent step to an appreciable extent. It will be noticed, however, that the step at which an appreciable decrease in amplitude takes place varies from zero or ground potential to positive potential. This step would, in the absence of the diodes 214, appear across one of the shunt branches of the line 18. However, the diodes 214 prevent the transmission of voltages which are positive with respect to ground. Accordingly, the significant portion of the control voltage which has steps which are substantially equal in amplitude is used to the exclusion of the portion of the control voltage having non-uniform amplitude steps. Since these steps of control voltage which are of lesser height than the steps in the significant portion are usually well beyond the safe minimum distance which should be maintained between cars, the elimination of these latter steps does not affect the operation of the system.

The elimination of the nonlinear portion of the control voltage is also illustrated in FIG. 11. It will be noted that the heights of the steps above ground potential varies somewhat exponentially in amplitude. By elimination of the steps through use of the diodes 214, only the more linear, significant portion of the control voltage is used.

The generating networks 202 serve to transmit distance control and warning signals indicative of the speed of the vehicle. The distance control and warning signals are formed and transmitted by a system of components including a clamping circuit 216, a gate circuit 218, an amplifier 220 and an adding network 222, these circuits being connected in tandem. The clamping circuit 216 is also operative as an impedance transforming device to prevent loading of the diode line 18 due to the generating networks 202. The diode 200 serves to provide biasing potentials for the clamping circuit as will be explained hereinafter. The signal transmitting line 206, which carries the sawtooth wave and its superimposed oscillations, is connected to the clamping circuit 216. The clamping circuit functions to clamp the waves from the line 206 to the voltage of the control voltage.

The operation of the clamping circuit 216 will be apparent from waveform C of FIG. 10. The sawtooth wave is raised in amplitude progressively and step-wise as it is clamped to the voltage of each step of the control voltage. If, for any reason, the control voltage wave fails, the sawtooth wave drops in amplitude or resumes its initial amplitude, which is, in the illustrated case, −15 volts. This will operate the generator to transmit signals to following cars that the leading car is just ahead (a dangerous condition). Thus, the system is fail-safe in case of loss of the control voltage. It will be noted that the peak-to-peak amplitude of the sawtooth wave is equal to the peak-to-peak amplitude of the control wave, which, in the illustrated case, is 15 volts. Both waves increase in the same sense, that is to say, in the negative sense.

The clamped output signal in the clamping circuit 216 is applied to the gate 218. The gate 218 is, as will be described in detail hereinafter, a circuit which transmits or gates voltages which are above ground potential (zero volts in the illustrated example). Thus, only those portions of the sawtooth wave which are raised and clamped above zero volts are transmitted. The higher in amplitude the control voltage, the smaller the portion of the sawtooth wave which is transmitted when both the sawtooth wave voltage and the control voltage are considered to increase in amplitude in the same sense (negative in the illustrated case).

The gate portion of the sawtooth wave is applied to the amplifier 220. Amplifier 220 incorporates alternating current coupling circuits which are operative to transmit only the 4.5 kc. oscillation which is superimposed on the sawtooth wave. Accordingly, bursts of 4.5 kc. oscillations will be transmitted which vary in duration in accordance with the portion of the sawtooth wave which is transmitted or gated through the gate circuit 218. The transmitted wave is illustrated in wave form D of FIG. 10. It will be observed that the bursts vary in duration or duty cycle from 100 percent duty cycle to zero percent duty cycle which correspond, respectively, to the transmission of a burst equal in duration to the period of the sawtooth wave to transmission of a burst of zero duration, or no burst.

The duration of the bursts varies in accordance with the distance of the vehicle from the block associated with the generating network which generates the bursts. Thus, the 4.5 kc. oscillations will be continuously transmitted if the vehicle is a considerable distance from the particular generating station. If the vehicle is in the block adjacent to the detector 14 which is directly connected to the generating network 202, no burst will be transmitted. The same condition results if the control signal fails as was pointed out above. The receiver which responds to the control signals is operative to indicate a minimum vehicle separation in the absence of signal. This, of course, will be a danger condition and the driver will be warned to stop the vehicle, or the vehicle will be automatically stopped. Since the same operation is obtained when the control voltage fails, the system is fail-safe in operation.

The bursts of 4.5 kc. oscillations are added to other signals in an adding network 222. The adding network output voltage is applied to an amplifier 224 which drives the antenna 52 associated with the generator 202.

The generator 202 is also operative to produce signals indicative of the speed of a vehicle on the highway. This portion of the system (202b in FIG. 8) is generally similar to the speed signal generating system shown in FIG. 2 of the drawings. The speed signal producing system is constituted of a differentiating circuit 226, a direct current amplifier 228 and a gate circuit 230. An oscillator 232 which produces oscillations at 8 kc., for example, is connected to the gate circuit 230, and the gate circuit is operative to gate the oscillations so as to produce bursts of 8 kc. oscillations upon occurrence of each pulse from the differentiating circuit. These bursts of oscillations are applied to the adding network 222 in addition to the 4.5 kc. signals. Thus, the speed signals and the distance signals are both transmitted simultaneously by the antenna 52 coupled to the generator 202.

Referring to FIGURE 9, the generator is shown in detail. A portion of the diode transmission line 18 is also shown. The signal generating network includes a pair of input connections 234 and 236 which are connected across the diode 200. The control voltage from the line 18 appears on the upper one of these connections 234. The general wave form of this control voltage is depicted adjacent the connection 234. The connection 234 leads to the base of a transistor 238. The connection 236 leads to the base of another transistor 240. The transistor 238 is of the P-N-P type and the transistor 240 is of the N-P-N type. Thus, the transistors 238 and 240 are complementary to each other.

These transistors 238 and 240 form part of an impedance transformation circuit. The collector of the upper transistor 238 is connected to a source of operating voltage indicated at −B. The emitters of the transistors are connected together. The collector of the N-P-N transistor 240 is connected to a source of bias voltage indicated, solely for purposes of illustration, as +3 volts. The output of the complementary transistors 238 and 240 is obtained at the emitters thereof. The output voltage of these transistors will be the same as the input voltage. In the other words, the control voltage appears at the output of the transistors 238 and 240.

In operation, the circuit including the transistors 238 and 240 provides an impedance transformation so that the impedance at the output of the circuit is many times lower than the impedance of the input thereof. The control voltage which appears at the output of the circuit therefore will not vary with changes in load due to the operation of the other system components of the generator 202.

Since a voltage drop appears across the diode 200, the P-N-P transistor 238 is biased slightly into its conducting region. However, this bias is insufficient to cause full conduction in the P-N-P transistor. The voltage across the diode 200 also causes the N-P-N transistor 240 to be biased into its conducting region. However, the bias is also insufficient to cause full conduction in the N-P-N transistor 240. When the control voltage appears across the shunt branch, either the transistor 238 or the transistor 240 will conduct so that the voltage at their common emitters will follow the control voltage. The P-N-P transistor 238 provides low output impedance for negative input signals and prevents the output of the pair of transistors 238 and 240 from becoming more positive than the input. The N-P-N transistor 240 provides low output impedance for positive input signals and prevents the output from becoming more negative than the input. As will be explained hereinafter, signal waves are applied to the clamping circuit 216. These waves may cause voltages to appear at the output of the transistors 238 and 240 which would be higher than the control voltage such that transistor cut-off would result and the control signal might possibly be blocked. However, the action of the N-P-N and P-N-P transistors obviates this possibility.

As an alternative, a resistor may be used in place of one of the transistors and the biasing diode 200 may be omitted. For example, this resistor may be connected from the emitter of the transistor 238 to the source of positive voltage (+20 volts). This provides a sufficiently high voltage at the emitter of the transistor 238 to prevent cut-off of the transistor and blocking of the control voltage.

It should be noted that the input connection 234 from the diode line is also connected to the linearizing diode 214. The operation of the linearizing diode was described in connection with FIG. 8 of the drawings.

The output of the impedance transformation circuit including the transistors 238 and 240 is connected to the clamping circuit 216. This clamping circuit includes a clamping diode 242 shunted by a discharge resistor 244. The circuit also includes a charging capacitor 246. The sawtooth wave having the 4.5 kc. oscillations superimposed thereon passes through the capacitor 246. The clamping circuit 216 functions to clamp the bottom of the sawtooth wave to the voltage at the output of the impedance transformation circuit. This is the output voltage which appears at the emitters of the transistors 238 and 240. The clamping circuit 216 operates in the conventional manner. The sawtooth wave charges the capacitor to the control voltage which appears at the output of the transistor circuit.

The clamped sawtooth wave and its superimposed 4.5 kc. oscillation passes through a resistor 248 to the gate circuit 218. The gate circuit 218 includes a diode 250 polarized to transmit positive current, and a tank circuit 252 which is resonant at 4.5 kc. or the frequency of the oscillations superimposed on the sawtooth wave. A dampening resistor 254 is shunted across the tank circuit to prevent ringing. The gate circuit operates so that only voltages which are positive with respect to ground are transmitted through the diode 250. Thus, portions of the sawtooth wave of duration depending upon the amplitude of the control voltage appear across the tank circuit 252. Since the tank circuit is resonant at the frequency of the oscillations superimposed on the sawtooth wave, only these oscillations appear across the tank circuit 252. The tank circuit effectively filters and removes the sawtooth wave.

The tank circuit is connected to a transistor amplifier 220 of conventional design which utilizes a P-N-P transistor 256. The circuit including the transistor 256 amplifies the bursts of 4.5 kc. oscillations. The amplifier 220 includes an alternating current coupling network provided by a capacitor 258. This coupling network insures the elimination of any direct current component in the output signal passed through the gate circuit 218.

The output of the amplifier 220 is connected to the adding network 222. The adding network 222 is provided by a plurality of resistors 260, 262 and 264. Accordingly, the distance control and warning signal constituted of bursts of 4.5 kc. oscillations is combined with speed control and warning signals which appear across the resistor 264. These signals are bursts of 8 kc. oscillations.

The additively combined signals are amplified in an amplifier 224. This amplifier includes two transistors 266 and 268. The transistor 266 is a P-N-P transistor connected in an emitter follower amplifier circuit. Suitable biasing potentials are applied to the base of the transistor 266 with a biasing resistor 270. The emitter of the transistor 266 is coupled through a capacitor 272 to the base of the other transistor 268.

An antenna coupling network including resistance-capacitance filter circuit 274 and a tank circuit 276 is connected between the emitter of the transistor 268 and the antenna 52. The tank circuit acts as a trap to prevent spurious signals which might be picked up by the antenna 52 from affecting the circuit. The antenna is driven by the amplifier 224 and propagates the signals in the output of the adding network 222.

The speed signal generating portion of the network illustrated in FIG. 9 includes the differentiating circuit 226, the amplifier 228 and a gate circuit 230.

The differentiating circuit is provided by a capacitor 278 and by a pair of resistors 280 and 282. The resistors 280 and 282 are returned to ground through the source of negative voltage at —B. The resistor 280 also serves to suppress transient negative peak voltages which might otherwise damage the amplifier 228. The differentiating circuit therefore produces a positive pulse at each step of the step wave. The leading edge of each step wave produces a negative pulse which is disregarded by the amplifier circuit 228.

The amplifier circuit 228 includes an N-P-N transistor 284. A negative operating voltage is applied to the emitter of this transistor 284 by a voltage divider 286. The voltage divider 286 is connected between the source of negative operating voltage at —B and ground. Output voltage from the transistor 284 appears across a collector resistor 288. A capacitor 290 is connected across the resistor 288. This capacitor and the collector resistor 288 provide a charging circuit having a longer time constant than the pulses amplified by the amplifier 228 and constitute a pulse stretching network.

The pulses after being stretched or extended somewhat in duration are coupled by means of a coupling resistor 292 to the gate circuit 230. The 8 kc. oscillations from the source of oscillation 232 (FIG. 8) are applied through a capacitor 294 and a resistor 296 to the gate circuit 230. A negative voltage appearing across a voltage divider 298 is applied through an inductor 300 of a tank circuit 302 to the anode of the diode 299 in the gate circuit 230. Accordingly, the diode 299 is biased to cut-off.

A polarity inversion of positive pulses applied to the base of the transistor 284 occurs in the amplifier circuit 228. Thus, negative pulses appear across the collector resistor 288. These negative pulses are of sufficient magnitude to make the cathode of the diode 299 negative with respect to its anode and therefore cause conduction through the diode. When the diode 299 conducts, the 8 kc. oscillations are transmitted or gated through the diode 299 to the adding network 222. The 8 kc. oscillations pass through a circuit including a coupling capacitor 304 and the resistor 264 of the adding network. Thus, speed control warning signals are added to the distance control warning signals in the adding circuit 222.

The additively combined speed and distance control and warning signals are then amplified in the amplifier 224 and fed to the antenna 52 for transmission to vehicles as they travel along the highway.

A receiver for the control and warning signals transmitted by the antennas 52 is shown in FIG. 12 of the drawings in block form. This receiver includes means for deriving the distance signal and the speed signal from the tail of signals propagated by the antennas 52.

The signal which corresponds to the distance from the vehicle generating the tail of warning signals to the following vehicle is derived by circuitry similar to the circuitry shown and described in connection with FIG. 6 of the drawing. Antennas 310 and 318 on the trailing vehicle pick up the 4.5 kc. signal and the 8 kc. signal which are transmitted as control and warning signals representative of distance and speed of the leading vehicle, respectively. These antennas may, for example, be loops which respond to the inductive field around the transmitting antennas 52.

The antennas 310 is connected to an amplifier 312 which amplifies the 4.5 kc. signal picked up by the antenna 310. The antenna 318 is connected to an amplifier 330. The amplifier 312 is coupled to a system 314 of circuits which measure the distance between vehicles. The amplifier 330 is coupled to another system 316 of circuits for measuring the speed of the leading vehicle.

The amplifier 312 is coupled to a limiter 320 which limits the amplitude of the bursts. The limited signals are rectified in a rectifier 322 and integrated in an integrating circuit 324. The output of the integrating circuit is connected to a terminal 326 and to a meter 328. The terminal 326 may be connected to the interlock or speed override circuit illustrated in FIGURE 14 and described in detail hereinafter. For purposes of accommodating the transistor circuitry in the override circuit it will be desirable to polarize the rectifier 322 with respect to ground so that increasingly negative voltages are produced with increasing distance of the vehicle ahead from the vehicle carrying the receiver, instead of increasing positive voltages. When the distance from the leading vehicle is short the absolute amplitude of the voltages will be small in any case.

The limiter 320, the rectifier 322, the integrating circuit 324 and the meter 328 serve to measure the distance between vehicles, as was explained in connection with FIG. 6 of the drawing in the case of the limiter 142, the rectifier 144, the integrating circuit 146 and the meter 152 shown in that figure. The output of the integrating circuit may be coupled to a servo system for automatically controlling the accelerator and brakes of the vehicle to slow and stop the vehicle before a minimum safe distance between the vehicles is reached.

The 8 kc. signal corresponding to the speed of a vehicle which leads another vehicle along the highway is limited in a limiter circuit 332 and produces bursts of limited 8 kc. oscillations corresponding in time of occurrence to times of occurrence of the leading edges of each of the steps of the control voltage.

These bursts trigger a monostable multivibrator 334. Such multivibrators are well known and produce a single square wave pulse for each trigger pulse. Such square wave pulses are illustrated in the wave form shown adjacent the output connection extending from the multivibrator 334. The pulses from the multivibrator operate a relay driving circuit 336 which includes a relay. The relay and the relay driving circuit control a timing circuit 338 which is operative to decode the pulses and provide the speed information. More particularly, the timing circuit 338 provides a voltage which varies in accordance with the speed of a vehicle which leads the vehicle equipped with the illustrated receiver, as both vehicles travel along the highway.

A voltage corresponding to the speed of a leading vehicle may be obtained by integration or differentiation of the distance or speed signals, respectively, as was described in connection with FIGS. 6 and 7 of the drawings. However, such differentiation and integration operations are not altogether desirable, particularly in the case where the speed of relatively slowly moving vehicles is being detected. The decoding or timing circuit 338 which is shown in FIGURE 12, and which will be described in detail in connection with FIGURE 13 of the drawings, operates to derive, from the 8 kc. distance signal, a voltage which increases uniformly with increasing speed of the vehicle regardless of the speed at which the vehicle is traveling.

This timing circuit 338 includes a timing capacitor 340. The charging and discharging of this capacitor is controlled by the relay in the relay driving circuit 336. Thus, the capacitor may, for example, be permitted to charge or discharge to a voltage determined by the frequency of the bursts of oscillation produced when the vehicle passes over a block on the highway. The voltage across the timing capacitor is transferred by a transfer circuit 342 to a storage capacitor 344. The transfer circuit may be an impedance transformation network which prevents loading and unwarranted discharge of the timing capacitor 340 due to variations in impedance in the circuit of the storage capacitor. Such variations in impedance may result in the charging and discharging of the storage capacitor.

The relay driving circuit is connected to the storage capacitor and operates to permit transfer of the voltage across the timing capacitor to the storage capacitor on occurrence of each burst of 8 kc. oscillations. Since the rate of occurrence of the bursts of 8 kc. oscillation depends on the speed of the leading vehicle, the timing capacitor will have charged to some magnitude of voltage at the time a succeeding burst occurs. This voltage will be a certain magnitude if the leading vehicle maintains a constant speed. If the leading vehicle decreases in speed, the magnitude of the voltage transferred to the storage capacitor will increase, since the timing capacitor will have charged to a voltage magnitude higher than the certain magnitude of voltage stored on the storage capacitor. On the other hand, if the leading vehicle increases in speed, the timing capacitor is not permitted to charge to this certain magnitude before the relay driving circuit operates to permit transfer of the voltage from the timing capacitor to the storage capacitor. The voltage on the storage capacitor will then decrease to a voltage magnitude less than the certain magnitude of voltage previously maintained thereon. Therefore, if a constant speed is held by the leading vehicle, the storage capacitor is kept at the same voltage and only leakage losses in voltage across the storage capacitor is recovered. If the vehicle speeds up or slows down, the storage capacitor is discharged or charged, respectively, to the voltage across the timing capacitor.

An anticipation circuit 346 is connected between the storage capacitor and the transfer circuit. Conceivably, a vehicle may stall on the highway so that the next successive burst of 8 kc. oscillations does not occur, or the vehicle may slow down to a speed such that the timing capacitor may be completely charged before the next successive burst of 8 kc. oscillations is transmitted. In the event that a vehicle stalls or slows down rapidly, the voltage across the timing capacitor and the voltage across the storage capacitor will assume different levels. The anticipation circuit responds to these different levels in voltage and permits transfer of voltage from the timing capacitor to the storage capacitor. The storage capacitor is then permitted to charge in anticipation, to a voltage which indicates a stalled or very slowly moving vehicle on the highway.

The voltage across the storage capacitor is amplified in an amplifier 348 and applied to a metering circuit 350. The metering circuit is operative to supply increasing voltage output with increasing speed of the vehicle. For example, in the circuit to be described hereinafter, a more negative voltage indicates increasing speed. It is desired to provide a less negative voltage as an indication of increasing speed. This circuit essentially therefore reverses the phase of the voltage developed across the storage capacitor. The metering circuit therefore provides fail-safe operation of the speed receiving system since it provides an output indicative of minimum speed in the absence of a signal voltage. Thus, any failure in the receiver or transmitter portions of the system will produce a danger or warning response or control voltage. The output of the metering circuit may be connected to a terminal 354 and to a meter 352. The terminal 354 is connected to the interlock or speed override circuit which will be described hereinafter in connection with FIG. 14 of the drawings.

Referring, now, to FIG. 13, the details of the timing circuit 338, the amplifier 348 and the metering circuit 350 are illustrated. The circuits are shown entirely as transistor and semiconductor circuits. It will be appreciated, however, that electron tube circuits suitable for performing similar operations may be used. The timing capacitor 340 is connected through a charging resistor 360 to a source of operating voltage indicated at —B. Negative voltages are used to operate the circuits since the circuits use primarily type P-N-P transistors which are more readily available with a wider variety of operating characteristics at the present time.

One side of the timing capacitor 340 is connected to a point of reference potential such as ground. The other side of the timing capacitor 340 is connected to the first of three transistor amplifier stages constituting the transfer circuit 342. These amplifier stages include three type P-N-P transistors 362, 364 and 366. Each of the stages is connected as an emitter follower stage and serves to progressively reduce the impedance of the output of the transfer circuit with respect to the input thereof. The input of the transfer circuit is the base of the transistor 362 in the first stage and the output of the transfer circuit is the emitter of the transistor 366 in the third stage.

A discharge circuit for the timing capacitor 340 is provided by a transistor 368. The collector of this transistor is connected to the timing capacitor 340. The emitter of the transistor is connected through a resistor 370 to ground. Thus, the emitter collector path of the transistor 368 is connected across the capacitor 340. The emitter of the transistor 368 is also connected through a resistor 372 to the source of operating voltage at —B. The discharge circuit is controlled by a switch 374 operated by a relay 376 which is in the relay driving circuit 336 shown in FIG. 12. This relay 376 also operates another switch 378 which is connected in circuit with the storage capacitor 344, as will be explained hereinafter.

The tongue of the switch 374 is connected to a capacitor 380. One side of the capacitor 380 is grounded. The tongue is normally (before relay pull-in) on a fixed contact 373 of the switch 374. This fixed contact 373 is connected to the base of the transistor 368 of the discharge circuit through a resistor 382. The base of the transistor 368 is also returned to ground through another resistor 384. The capacitor 380 is charged to a negative voltage when the relay 376 pulls in, since the tongue of the switch 374 then contacts the fixed contact 375 which is connected through a resistor 386 to the source of operating voltage at —B.

The voltage transfer circuit 342 is connected to the storage capacitor 344 through the switch 378 of the relay 376. The storage capacitor 344 may be of larger value of capacitance than the timing capacitor 340 so that its time constant is longer. Charge will therefore be stored in the storage capacitor 344 for a longer period of time than charge is stored in the timing capacitor 340.

The anticipation circuit 346 is provided by a diode 388 connected between the emitter of the transistor 366 in the transfer circuit and the storage capacitor 344. The anticipation circuit 388 effectively shunts the switch 378. The diode 388 is polarized so that it conducts only when the voltage across the storage capacitor is greater than the voltage at the output of the transfer circuit. Since the voltage at the output of the transfer circuit corresponds to the voltage across the timing capacitor 340, the diode 388 will conduct when the voltage across the timing capacitor 340 is more negative than the voltage across the storage capacitor.

The storage capacitor 344 is connected to the input of the amplifier 348. The amplifier 348 includes a pair of transistors 390 and 392 of the P-N-P type. These transistors are connected in cascaded emitter follower circuits. Accordingly, the impedance at the output of the amplifier 348 is lower than the impedance at the input thereof. The output of the amplifier 348 is derived across the emitter resistor 394 of the transistor 392. The input of the amplifier is at the base of the first transistor 390. A resistor 396 is connected to a point on an emitter resistor 398 in the first emitter follower stage of the amplifier 348. This resistor 396 and a portion of the emitter follower resistor 398 provide part of a discharge circuit for the storage capacitor 344. This discharge circuit includes the base-to-emitter path in the transistor 390. The resistor 396, which is connected to the source of operating voltage at —B, sets the minimum voltage to which the storage capacitor 344 may discharge. A portion of the resistor 398 may be provided by a potentiometer in order to calibrate the measuring circuit 350.

The measuring circuit 350 includes a P-N-P transistor 400 and an N-P-N transistor 402. The base of the transistor 400 is connected to the output of the amplifier 348. The emitter of the transistor 400 is connected through a resistor 404 to the same point on the emitter resistor 398 of the transistor 390 as is the resistor 396. The transistor 400 is effectively in a D.C. amplifier stage which is operated at a potential somewhat above ground equal to the voltage to which the timing capacitor 340 is discharged. This improves the linearity of operation of the amplifier.

The emitter of the N-P-N transistor 402 and the collector of the P-N-P transistor 400 are connected, through a common resistor 406, to the source of operating voltage at —B. A portion of this resistor 406 may be a variable resistor which is useful in calibrating the measuring circuit. The collector of the transistor 402 is connected to ground through a resistor 408. A voltage divider 410 is connected between ground and the source of operating voltage at —B. The base of the transistor 402 is connected to this voltage divider so that the voltage at the base of the N-P-N transistor 402 is normally maintained positive with respect to the emitter thereof. A potentiometer 412 is connected across the resistor 408. The meter 352 is connected from the arm of the potentiometer to ground. The output voltage to be measured appears across the potentiometer 412. The terminal 354 is also connected to the ungrounded side of the meter 352. This terminal is provided for connection to the override circuit which will be described hereinafter in connection with FIG. 14.

In operation, the relay 376 is energized to pull in on occurrence of a burst of the 8 kc. oscillations which energizes the multivibrator 334 and the relay drive circuit 336 as was explained above in connection with FIG. 12. The capacitor 380 is then charged to a negative voltage above ground by way of the circuit including a set of contacts 374 and the resistor 386. When the relay 376 releases after the pulse from the multivibrator terminates, the capacitor 380 discharges through resistors 382 and 384. A negative voltage then appears on the base of the transistor 368. This transistor 368 is normally cut off, because of the negative bias applied to its emitter through the resistor 372, and is rendered conductive only when the relay 376 releases. A low impedance discharge path through the resistor 370 and the emitter-to-collector path of the transistor 368 therefore is established across the timing capacitor 340. This capacitor 340 then discharges almost to ground potential. The capacitor 380 discharges quickly and in a minute fraction of the time up to when the next burst of 8 kc. oscillations might occur. The timing capacitor 340 therefore begins to charge through the resistor 360 to a negative potential. This negative potential appears on the base input of the impedance transforming circuit 342. A voltage corresponding to the voltage across the timing capacitor 340 therefore continuously appears during the discharge of the timing capacitor 340 at the emitter of the transistor 366.

Upon occurrence of the next pulse due to the 8 kc. burst of oscillation, the relay 376 again pulls in. The set of contacts 378 connects the storage capacitor 344 to the emitter of the transistor 366. The storage capacitor 344 is then quickly charged through a charging circuit having a low time constant to a voltage approximately equal to the voltage across the timing capacitor 340. The impedance transformation in the impedance transforming network 342 provides a low value of resistance in the charging circuit of the storage capacitor 344. This low time constant makes the time of charging of the storage capacitor a minimum.

After the pulse terminates, the relay 376 releases. The tongue of the switch 378 breaks its connection before connection is made in the other switch 374. The storage capacitor holds the charge. The timing capacitor 340 is discharged by the action of the discharge circuit including the transistor 368, and a voltage equal to the peak voltage across the capacitor 340 is maintained across the storage capacitor 344. After discharging, the timing capacitor 340 again begins charging towards a negative voltage.

Upon occurence of the next pulse due to the 8 kc. oscillations, the relay 376 again pulls in. Pulses of 8 kc. oscillation occur at equal time intervals if the vehicle maintains constant speed. If the vehicle speeds up, the pulses will occur sooner in time; if the vehicle slows down, the pulses will occur later than would be the case if the vehicle maintained a constant speed. Thus, when the relay 376 pulls in, the capacitor 340 will have charged to the same voltage as was the case on occurrence of the preceding pulse, should the vehicle have maintained the same constant speed. In the case of constant speed, the storage capacitor 344 will maintain the same voltage. The capacitor 344 may discharge slightly to recover some loss of voltage due to charge leakage. However, this voltage loss will be substantially negligible. On the other hand, if the vehicle has increased in speed the voltage across the storage capacitor will not have reached as negative a voltage as was the case on occurrence of the previous pulse. Thus, the storage capacitor 344 will discharge through the emitter resistor 367 of the transistor 366. In other words, the voltage across the storage capacitor 344 will become less negative.

When the vehicle slows down, the timing capacitor 340 will have an opportunity to charge to a more negatve voltage than was the case on preceding pulses. When the relay 376 again pulls in, the storage capacitor 344 will then charge to a more negative voltage. In other words, the voltage across the storage capacitor 344 varies inversely with the speed of the vehicle. This voltage decreases or becomes more negative with increasing vehicle speed. It is desirable to provide an output voltage which becomes less negative with increase in speed of the vehicle. Moreover, it is desirable to stop the following or trailing vehicle when the leading vehicle shows down. An indication to slow down to the following vehicle is desirably a signal of decreasing voltage. It is also desirable to stop the following vehicle if signals fail or if the leading vehicle slows down unexpectedly. In order to provide a fail-safe operation, an absence of signal should operate the controls of the following vehicle to quickly cause the following vehicle to slow down or stop. The metering circuit 350 which will be described in detail presently, reverses the phase of the voltage across the storage capacitor 344 and thus provides the necessary variation in voltage with speed and the desirable fail-safe operation.

The anticipation circuit provided by the diode 388 permits the capacitor 344 to charge to a negative voltage in the event that the voltage across the timing capacitor 340 becomes more negative than the voltage across the storage capacitor; or, in other words, the diode 388 permits operation of the timing circuit to anticipate when the leading vehicle slows down. Thus, if the leading vehicle stops almost simultaneously, as would occur if the leading vehicle stalls or collides with another vehicle ahead of it, the voltage across the storage capacitor would become more negative, therefore producing an indication or control signal to the following vehicle to slow down and stop.

The measuring circuit 350 is coupled to the storage capacitor 344 by the transistor stages 390 and 392 in the amplifier 348. The voltage across the emitter resistor 394 of the transistor 392 will vary in accordance with the voltage across the storage capacitor 344, since the transistor stages are emitter followers.

When the voltage across the emitter resistor 394 decreases, as would be the case if the leading vehicle were slowing down, a more negative voltage would appear on the base of the transistor 400.

The transistor 400 would then be rendered more conductive. The voltage drop would increase across the resistor 406 in the circuit common to the emitter of the transistor 402 and the collector of the transistor 400. The voltage on the emitter of the resistor 402 would then increase (go more positive). This increase in voltage reduces (makes more negative) the voltage between the base and emitter of the N-P-N transistor 402. The transistor 402 is thereby rendered less conductive; thus, the voltage drop across the collector resistor 408 of the transistor 402 increases (becomes more positive). This increase in voltage corresponds to a decrease in voltage on the base of the transistor 400. The resistor 402 is connected across the potentiometer 412 and operates the meter 352. Accordingly, an increase in voltage will occur corresponding to an increase in speed of the leading vehicle. As mentioned above, an increasing or less negative voltage signal for increasing vehicle speed is desirable. The meter 352 may be calibrated in terms of speed.

Figure 14:
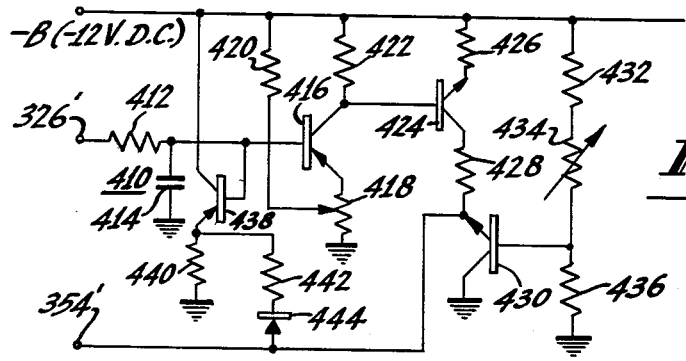
FIGURE 14 is a diagram of a circuit which may be used in conjunction with the circuit shown in FIG. 13.

Referring to FIG. 14, a circuit for interlocking the speed and distance responsive systems of the receiver shown in FIG. 12 is illustrated. This circuit is operative to override the speed signals with the distance signals in cases where a vehicle is located far ahead of the next following vehicle. In some vehicle control systems, it is desirable to use the speed control signal to operate a servo system which will control the acceleration and braking of the vehicle. Since the speed control signal may be produced in response to a vehicle which is far ahead of the following vehicle on the highway, it is desirable to override the speed signal with a distance signal so that the followng vehicle may be run at maximum permissible speed until it comes closer to the leading vehicle.

The circuit shown in FIG. 14 includes a plurality of transistor stages which are operated by the signal from the integrating circuit 324 (FIG. 12) and by the signal from the measuring circuit 350 (FIG. 13). The signal from the terminal 326 in the circuit of FIG. 12 may be applied to the terminal 326' in the circuit of FIG. 14. The signal applied to terminal 326' like the signal at the terminal 326 is a voltage corresponding in amplitude to the distance between vehicles, and this voltage desirably varies from ground potential to increased negative potentials with increased distance between vehicles. As pointed out above, such potential variation to increased negative potentials is provided for accommodation of the transistors used in the illustrative circuits represented in the drawings.

The terminal 354 in the measuring circuit 350 of the receiver (FIG. 13) is connected to a terminal 354'. A voltage, which becomes more negative as the speed of a vehicle on the highway increases, appears at the terminal 354 and is applied to the terminal 354' in the override circuit illustrated in FIG. 14. The voltage applied to the terminal 326' is adapted to override the voltage applied to the terminal 354' when the voltage applied to the terminal 326' is greater than a certain absolute magnitude indicative of a large distance separating a leading vehicle and a vehicle carrying the receiver including the circuit of FIG. 14.

The override circuit provided by the present invention and illustrated in FIG. 14 also provides the features of (1) limiting the maximum speed of a vehicle regardless of the speed of the vehicle it follows; and, (2) providing for fast pickup in speed when the leading vehicle accelerates. Accordingly, the circuit of FIG. 14 permits vehicles which follow one another along the highway to travel at maximum speed, but at no greater than the speed desired by the vehicle operator.

The input terminal 326' is connected through a low pass filter 410 to the base of a P-N-P transistor 416. The filter 410 includes a resistor 412 and a capacitor 414. This filter removes transient voltage variations in the distance signal which may be produced as a vehicle moves from block to block along the highway. These signal variations are high frequency transients which are by-passed to ground by the filter. The transistor 416 is operated as a threshold device so as to be normally cut off except when the distance signal applied to the base of the transistor 416 is more negative than a certain negative voltage indicative of a large distance between vehicles (for example, a few hundred feet). A potentiometer 418 is connected between ground and the emitter of the transistor 416. The arm of this potentiometer 418 is connected through a resistor 420 to the source of operating voltage indicated as −B in the drawing. This voltage may be −12 v. D.C. in the illustrated circuit. The collector of the transistor 416 is connected to the source of operating voltage through a collector resistor 422. The resistor 420 and the potentiometer 418 establish a negative voltage on the emitter of the transistor 416. The voltage applied to the input terminal 326' to the distance signal must be more negative than the voltage on the emitter before conduction in the transistor 416 can take place.

A N-P-N type transistor 424 is provided. The base of this transistor 424 is connected to the collector of the transistor 416. The emitter of the transistor 424 is connected through a resistor 426 to the source of operating voltage —B. The collector of the transistor 424 is connected through a resistor 428 to the emitter of another N-P-N transistor 430. The transistor 430 is base connected to a voltage divider constituted of a resistor 432, a potentiometer 434 and another resistor 436. The resistors 432, 434, and 436, constituting the voltage divider, are connected between the source of negative voltage —B and ground. The input terminal 354 is connected to the emitter of the transistor 430. The circuit including the transistor 424 and 430 provides for addition of a voltage corresponding to large separation distance between vehicles to be added to the voltage appearing at the speed voltage input terminal 354'. The voltage at the terminal 354' is, therefore, overriden. This circuit including transistors 424 and 430 also provides means for limiting the maximum speed of a vehicle equipped with the circuit. The potentiometer 434 provides a control whereby a maximum vehicle speed may be set at will by the vehicle operator.

When the distance signal is greater than the threshold amplitude, a voltage appears on the base of the transistor 424 which is greater than the voltage on its emitter. The transistor 424, therefore, permits current to flow through a circuit including the internal resistance of the measuring circuit (primarily a portion of the potentiometer 412, see FIG. 13), the resistor 428, the collector-to-emitter path of the transistor 424 and the resistor 426. The voltage at the terminal 354' becomes more negative because of the direction of current flow which is established by the N-P-N transistor 424. Accordingly, the speed measuring circuit 350 provides an output voltage indicative of a fast moving leading vehicle, although the leading vehicle may be a distant slow moving vehicle. A vehicle equipped with the circuits, FIGS. 13 and 14, therefore, may speed up to close the gap between it and a distance vehicle. As soon as the gap between the vehicles is reduced so that the distance signal voltage at the terminal 326' is less negative than required to cause conduction in the transistor 416, the voltage applied to the base of the other transistor 424 becomes negative with respect to its emitter. Conduction in the transistor 424 is then cut off. Accordingly, the transistor 424 is cut off and additional negative voltage no longer appears at the terminal 354'. The equipped vehicle again comes under the control of the speed control voltage alone.

The limit control circuitry prevents the voltage at the terminal 354' from becoming more negative than a certain predetermined amplitude. Since the more negative the voltage at the terminal 354, 354', the greater the speed to which the equipped vehicle is permitted to travel, the limit control circuitry controls the speed of the vehicle by limiting the voltage at the terminal 354 to a maximum negative voltage. The voltage at the base of the transistor 430 is set by means of the potentiometer 434 to be a certain negative voltage depending upon the desired speed of the vehicle. The transistor 430 will not conduct unless the voltage on its emitter is more negative than the voltage on its base. Accordingly, when the voltage at the terminal 354' exceeds a certain negative voltage, conduction takes place through a circuit including the internal resistance of the measuring circuit 350 (primarily the resistance of the potentiometer 412, FIG. 13) and the collector-to-emitter path of the transistor 430. Since current flows from collector to emitter in the N-P-N transistor 430, the voltage at the terminal 354' will increase until the emitter of the transistor 430 becomes more positive than the base of the transistor 430. In the last mentioned case, the transistor 430 again becomes cut off and no longer contributes to the voltage appearing at the terminal 354'.

In order to provide fast pick-up when the distance between vehicles increases, a transistor 438 of the P-N-P type is provided. The base of this transistor 438 is connected to the output of the filter 410, and responds to the distance control voltage appearing at the terminal 326'. The collector of the transistor 438 is connected to the source of operating voltage —B. The emitter of the transistor 438 is connected to ground by a resistor 440. The emitter of the transistor 438 is also connected to the speed control voltage input terminal 354' through a resistor 442 and a diode 444. The diode 444 is polarized to conduct, when the voltage at the emitter of the transistor 438 is more negative than the voltage at the input terminal 354'.

The transistor 438 functions as an emitter follower stage. Thus, the voltage across the resistor 440 is equal to the voltage at the input terminal 326'. When the speed control voltage at the terminal 354' becomes less negative than the distance control voltage appearing across the resistor 440, the diode 444 is rendered conductive in its forward direction. This permits current to flow through a circuit including the internal resistance of the measuring circuit 350 (primarily potentiometer 412, FIG. 13), the diode 444 and the resistors 440 and 442. The direction of this current is such that the voltage at the terminal 354 may become more negative. A more negative voltage at the terminal 354' indicates that the leading vehicle is speeding up. Accordingly, the following vehicles equipped with circuits illustrated in FIGS. 13 and 14 may accelerate to close the gap between vehicles. Of course, when the gap is closed the voltage across the resistor 440 becomes less negative and conduction through the diode ceases. The following vehicle, therefore, comes under the control of the voltage at the output terminal 354', as is normally the case.

Figure 15:
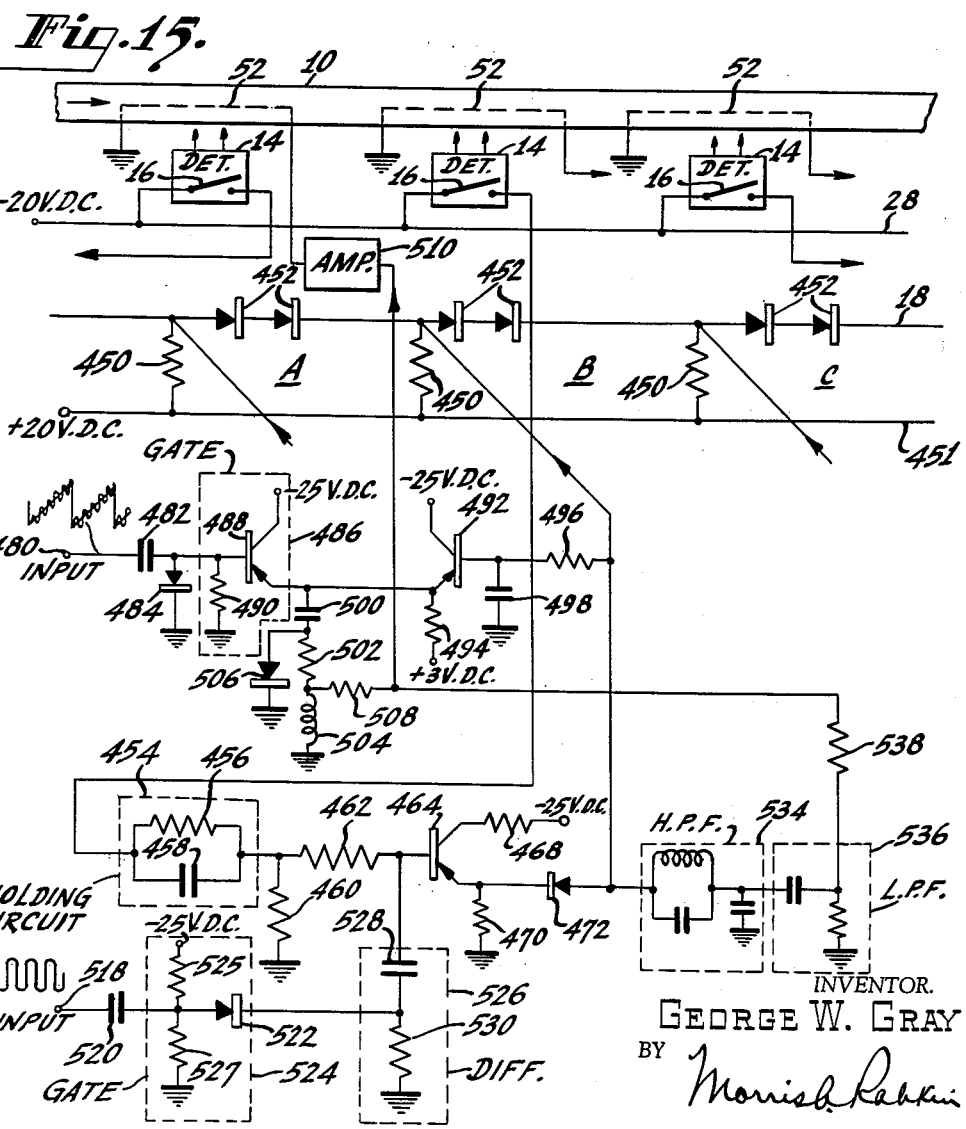
FIGURE 15 is a schematic circuit diagram of a system for transmitting a tail of signals along a highway in accordance with still another embodiment of the invention.

Referring to FIG. 15, another embodiment of a system for transmitting a tail of control and warning signals is represented. Similarly with the system illustrated in FIG. 1, detectors 14 are provided along the highway 10. The vehicles travel along the highway in the direction indicated by the arrow. The detectors 14 may be associated with detecting or sensing loops such as the loops 12 illustrated in FIG. 1. Antennas 52 are also provided with the loops in adjacent blocks along the highway. Although three antennas 52 and three detectors 14 are illustrated in FIG. 15, it will be appreciated that this is done to simplify the drawings and any number of antennas and detectors may be used. The loops 12 are also not shown in FIG. 15 for drawing simplification purposes. A voltage attenuating transmission line 18 is provided along the highway number 10. This line 18 is constituted of a plurality of sections. One section is provided for each block along the highway. The sections include shunt resistors 450 which may be of equal resistance and a pair of series diodes 452. The illustrated sections are labeled A, B, and C in the drawing. A direct current transmission line 451, which extends along the highway, is connected to the shunt resistor 450. This direct current transmission line 451 is connected to a source of voltage which has a value of +20 v. D.C. This voltage value and other values of voltage which will be mentioned presently, are cited solely for purposes for clarifying the description. Other voltage values may obviously be used in different applications depending, for example, on transistor types and the like. Each section of the line 18 provides a certain voltage drop as was the case for the transmission line 18 illustrated in FIG. 1. Since the line includes the diodes 452, the voltage drop in each section is substantially the same. For example, the diodes 452 may each be a type 1N599 diode. When these diodes are rendered fully conductive, they each provide a voltage drop in the forward direction of approximately 0.6 volt. Two diodes are connected in series in each section of the line 18 to provide a voltage drop of 1.2 volts per section. Associated with the line 18 and with the antennas 52 are generators which respond to the actuation of the detectors 14 by a vehicle traveling along the highway and produce distance control and warning signals and speed control and warning signals for propagation by the antennas 52. Only one of these generators is illustrated in FIG. 15. The generators include circuits for generating a control voltage, the speed control and warning signal and distance control and warning signals. The control voltage is the voltage which is transmitted along the voltage attenuation line 18 in response to actuation of the detectors 14 by vehicles. This control voltage was described in connection with FIG. 1 of the drawing and is represented in waveform b of FIG. 4. The circuit for generating the control voltage includes a holding circuit 454 which is connected to the detector 14. The holding circuit is constituted of a resistor 456 and a capacitor 458. The output of the holding circuit is connected to a resistor 460 which provides a voltage divider with the resistor 456. Each of the detectors is connected to a different generator and directly to the holding circuit of the generator. These and other generators are not illustrated in FIG. 15. However, the fixed contacts of the switches 16 shown in the detectors 14 are connected to these other generators as indicated by arrows on leads extending therefrom.

Returning to the holding circuit 454, the output of the holding circuit is connected through a resistor 462 to the base of a transistor 464. The collector of the transistor 464 is connected through a resistor 468 to a source of operating voltage indicated as being −25 v. D.C. The emitter of the transistor 464 is connected to an emitter resistor 470. The transistor 464, therefore, is connected as an emitter follower stage. The emitter of the transistor 464 is connected through a diode 472 to the section of the line 18 which is associated with the same block of the highway as the detector 14 to which the holding circuit 454 was connected.

When a vehicle actuates the detector 14 to cause the switch 16 thereof to close, a control voltage pulse appears across the shunt resistor 450 in the section of the line 18 associated with the detector 14. This control voltage pulse is propagated along the line 18 in a direction opposite the direction of travel of vehicles along the highway 10. The pulse is attenuated in each successive section of line 18. Accordingly, when a vehicle travels along the highway and actuates successive ones of the detector 14, a control voltage similar to that shown in waveform b of FIG. 4, is generated at each section of the line 18.

In operation, the diodes 452 are normally biased for conduction in their forward direction. A direct current path is provided by the shunt resistor 450, the diode 472 and the emitter resistor 470 to ground. Current flows along this direct current path due to potentials supplied by the +20 v. D.C. source connected to the line 451. A voltage drop is established across the emitter resistor 470 which biases the emitter of the transistor 464 positive with respect to ground. Since the base of the transistor 464 is connected to ground through the resistors 460 and 462, the base of the transistor 464 is normally at ground potential. Thus, the base of the transistor 464 is negative with respect to its emitter and the transistor 464 is normally conductive. Since the transistor 464 is normally conductive, its emitter-to-collector path and the resistor 468 are effectively in parallel with the emitter resistor 470 in the direct current path from the line 451 to ground.

When a vehicle actuates the detector 14, the switch 16 therein closes. The −20 v. D.C. line 28 is then connected to the holding circuit 454. The purpose of the holding circuit will be brought out presently. The holding circuit includes a resistor 456 which, with the resistor 460, defines a voltage divider. The ratio of the resistances of the resistors 456 and 460 may, for example, be such that in steady state condition (a short time after the detector 14 is actuated and its switch 16 closes) the voltage across the resistor 460 is approximately −15 v. D.C. with respect to ground. This −15 v. D.C. is applied to the base of the transistor 464. Since the diode 472 is biased in its forward direction, and is conductive, the voltage at the emitter of the transistor 464 is applied to the attenuating line 18 at the junction of the shunt resistor 450 and the diodes 452 in section B of the line 18. This voltage is transmitted down the line in a direction opposite to the direction of travel of the vehicle along highway 10. This voltage constitutes the control voltage which is used to provide the distance control and warning signals as will be explained hereinafter.

The holding circuit 454 is so named because it develops and holds a voltage upon closure of the switch 16 in the detector 14. In the transient condition of operation of the circuit which occurs upon initial actuation of the detector 14, the holding circuit effectively provides a short circuit from the switch 16 in the detector 14 to the resistor 462 which is connected to the base of the transistor 464. The voltage divider provided by the resistors 456 and 460 is therefore essentially ineffective in dividing the voltage applied to the holding circuit 454 from the line 28 (−20 v. D.C.). Thus, the entire voltage (−20 v. D.C.) is applied to the transistor 464 base. Since the transistor 464 functions as an emitter follower and since the diode 472 is conductive, the entire voltage (−20 v. D.C.) is applied to section B of the diode line.

It will be recalled that in the steady state the voltage applied to the diode line is less than the voltage at the line 28 or approximately −15 v. D.C. The holding circuit 454 provides means for biasing the diodes 452 in a section of the line (section A for example) in their forward direction in the event that the normal control voltage (−15 v. D.C.) were applied to the next successive, adjoining section of the line (section B for example). Assume that a vehicle actuates the detectors associated with two adjacent blocks of the highway 10 successively and simultaneously. The detector associated with section A of the line 18 is actuated and the control voltage of −15 v. D.C. in the illustrated case is applied to the junction of the diodes 452 and the resistors 450 in section A of the line 18. The detector associated with section B of the line is then actuated before the detector associated with section A of the line is deactuated. Control voltage is now applied to the junction of the resistor 450 and the diodes 452 in section B of the line. Because of the holding circuit 454, the voltage across the resistor 450 in section B of the line is more negative in the transient condition, than the voltage across the resistor 450 in section A of the line. The diodes 452 in section A of the line will therefore be biased in their forward direction when the detector 14 associated with section B of the line is initially actuated; that is to say, in the transient condition. As will be brought out presently in the description of FIG. 15, the speed control and warning signals are generated and propagated along the line 18 when the detectors are initially actuated. Since the diodes 452 are always biased in their forward direction at the time the detectors are initially actuated, the speed control and warning signals are transmitted by the diodes 452 in each section of the line 18.

Generation of the distance control and warning signals is provided by the circuitry connected to an input terminal 480. A sawtooth wave having oscillations added thereto (e.g. of 4.5 kc.) is applied to this input terminal 480. This sawtooth wave may be generated by a function generator similar to the function generator 204 (FIG. 8). The waveform of the wave applied to the input terminal 480 may be similar to the waveform shown in FIG. 10A. A portion of this waveform is drawn near the input terminal 480 on the drawing. The input terminal 480 is connected to a clamping circuit provided by a capacitor 482 and diode 484. The capacitor 482 and diode 484 clamps the top of the wave to ground potential.

The clamping circuit is connected to a gate circuit 486 provided by a transistor 488. A resistor 490 is connected between the base of the transistor 488 and ground in order to complete the direct current path through the transistor 488. The collector of the transistor is connected to the source of operating voltage (−25 v. D.C., for example). The emitter of the transistor 488 is connected to the emitter of another transistor 492 in an emitter follower transistor stage. This emitter follower transistor stage includes an emitter resistor 494 connected to a source of positive bias (+3 v. D.C., for example). This bias source may be provided for temperature stabilization purposes. The base of the transistor 492 is connected to a low pass filter provided by a resistor 496 and a capacitor 498. The resistor 496 is connected to the attenuating line 18 section B at the junction of the resistor 450 and the diodes 452. Thus, the control voltage transmitted along the attenuating line 18 passes through the low pass filter and is applied to the base of the transistor 492. The low pass filter removes transient variations in the control voltage and functions in a manner similar to the low pass filter 410, (FIG. 14).

Connected to the emitters of the transistors 488 and 492 is a tank circuit provided by a capacitor 500, a resistor 502 and an inductor 504. The inductor 504 and the capacitor 500 are tuned to resonance at the frequency of the oscillations added to the sawtooth wave applied to the input terminal 480 (4.5 kc.). A diode 506 is connected between ground and the junction of the capacitor 500 and the resistor 502 in the tank circuit. An output resistance 508 is connected to the junction of the resistor 502 and the inductor 504 and to an amplifier 510. The amplifier drives the antenna 52 which is in the block immediately preceding the block with which the detector of the illustrated generator is associated.

In operation, the control voltage appears across the emitter resistor 494 and controls the voltage on the emitter of the transistor 488 in the gate circuit 486. The gate circuit 486 therefore transmits only that portion of the wave applied to the input terminal 480 which is more negative than the control voltage. The operation of the gate circuit is similar to the operation of the circuits described in connection with FIGS. 3 and 9 of the drawings, and particularly in connection with the wave forms shown in FIG. 10 of the drawings. The tank circuit provided by the capacitor 500 and inductor 504 is driven by the oscillations in the portions of the wave transmitted by the gate circuit 486. These oscillations will appear across the inductor 504 of the tank circuit, are amplified in the amplifier 510, and are propagated by the antenna 52 which is driven by the amplifier 510. Accordingly, bursts of 4.5 kc. oscillations are propagated by the antenna 52. The duration of these bursts correspond to the amplitude of the control voltage as was explained heretofore.

The speed control and warning signals are generated by circuitry connected to an input terminal 518. A course of oscillation such as the oscillator 232 (FIG. 8) may be connected to the terminal 518. For example, this source may provide oscillations of 8 kc. The terminal 518 is connected through a coupling capacitor 520 to a diode 522 in a gate circuit 524. Also included in this gate circuit 524 is a voltage divider provided by two resistors 525 and 527. The resistor 525 is connected between the diode 522 and the source of operating voltage (−25 v. D.C.). The other resistor 527 is connected to ground. The diode 522 in the gate circuit 524 is connected to a differentiating circuit 526 provided by a capacitor 528 and a resistor 530. The cathode of the diode 522 is connected through the resistor 530 to ground. The anode of the diode 522 is biased negatively with respect to ground by the voltage divider including the resistors 525 and 527 in the gate circuit 524. Accordingly the diode 522 is normally cut off.

The differentiating circuit 526 is connected to the resistor 462 which is in circuit with detector 14. When the detector 14 is actuated, the same negative voltage impulse which is applied to the base of the transistor 464 is also applied to the differentiating circuit 526. This differentiating circuit 526, therefore, applies a negative pulse to the cathode of the diode 522 and gates the diode 522 into a conductive state. Accordingly, the oscillations applied to the input terminal 518 will be transmitted through the diode 522, the capacitor 528, the transistor 464, and the diode 472 to a high pass filter 534. The high pass filter 534 is connected to a low pass filter 536. The low pass filter 536 is connected through a resistor 538 to the amplifier 510. The amplifier 510 drives the antenna 52.

The 8 kc. oscillations are transmitted through the high pass filter 534 and the low pass filter 536 which are designed to pass a narrow band of frequency including 8 kc. The 8 kc. oscillations are amplified and transmitted by the same antenna as transmits the 4.5 kc. oscillation bursts. It will be observed that the 8 kc. oscillations are also transmitted through the diodes 452 into the attenuating line 18 and will be propagated down the attenuating line along with the control voltage. Also, the 8 kc. oscillations which are generated upon actuation of any of the detectors along the highway are transmitted by the attenuating line 18 and are applied to the high pass filter 534. These 8 kc. oscillations also pass through the high and low pass filters 534 and 536 and are amplified in the amplifier 510 for propagation by the antenna 52. The high pass and low pass filters 534 and 536 prevent the transmission of spurious oscillations (e.g., due to pick up in the line 18). It will be noted that the 8 kc. oscillations transmitted by the line 18 are not attenuated to the same degree as the control voltage. This is because alternating current resistance of the diodes 452 is much less than the direct current resistance when the diodes 452 are biased for operation in the forward direction. The diodes 452 therefore offer comparatively little resistance to the 8 kc. oscillations.

The 8 kc. oscillation will be transmitted in short bursts. One burst is transmitted upon actuation of each detector 14. Accordingly, the speed of travel of vehicle which actuates these detectors is relative to the repetition rate of the bursts of 8 kc. oscillations.

It will be observed that actuation of the detector 14, which is associated with the holding circuit 454 causes an 8 kc. burst to be propagated by the antenna and transmitted along the attenuating line 18. Thus the propagation and transmission of speed control and warning signal is independent of the transmission of the control voltage along the attenuated line in the system illustrated in FIG. 15. The system illustrated in FIG. 15 provides another factor of safety since the speed of the vehicle may be controlled by both the speed and the distance control and warning signal which may now be generated independently of each other.

From the foregoing description, it will be apparent that there has been provided an improved vehicle control system by means of which warning and control signals corresponding to the distance and speed of vehicles as they travel along the highway may be transmitted and received. The system is useful in automatically controlling the speed of vehicles and is operative to prevent accidents which might otherwise occur.

While several embodiments of receiving and transmitting portions of the system have been shown, it will be appreciated that other embodiments and forms of the system, as well as variations in those described herein, will become apparent to those skilled in the art. Accordingly, it is desired that the foregoing be considered merely as illustrative and not in any limiting sense.

What is claimed is:

1. In a vehicle control system for vehicles which are adapted to travel along a highway one following the other, the combination which comprises means spaced along said highway for propagating signals to said vehicles for the control thereof, means for detecting the presence of vehicles on said highway, and signal generating means responsive to said detecting means for operating said propagating means to propagate a first signal indicative of the distance between said vehicles and a second signal different from said first signal and indicative of the speed of said vehicles to thereby convey information for the control of said vehicles on said highway.

2. The combination as claimed in claim 1 wherein said signal generating means includes means to propagate said first signal indicative of the distance between said vehicles at one frequency and said second signal indicative of said speed at a different frequency.

3. The combination as claimed in claim 1 wherein said vehicle control system includes signal receivers for installation in said vehicles and which comprise means for separating said distance signal and said speed signal, and signal utilization means operated by said separated signals.

4. In a control system for vehicles which are adapted to follow each other along a highway, the combination which comprises a plurality of signal responsive vehicle control devices, a plurality of means spaced along said highway each for detecting the presence of one of said vehicles, and means responsive to several of said plurality of detecting means each for generating a pair of signals which vary correspondingly with the passage of said one vehicle past each of said detecting means, said pair of signals being respectively indicative of (a) the distance between said one vehicle and the next following one of said vehicles and to (b) the speed of said one vehicle, said signals conveying information to said devices for controlling the speed of and spacing between said vehicles.

5. In a control system for vehicles which are adapted to follow one another along a path, the combination which comprises means disposed at successive points along said path for detecting the passage of said vehicles, and means coupled to said detecting means for transmitting, in response to the passage of said vehicles, tails of repetitive signals along said path behind each of said vehicles, which signals in each of said tails vary in duration in accordance with the distance along said path behind each said vehicle from the respective said vehicles to the respective said detecting means to thereby convey information as to the safe spacing between said vehicles traveling along said path.

6. In a control system for vehicles which are adapted to follow one another along a highway, the combination which comprises means disposed at successive points along said highway for detecting the passage of said vehicles, and means disposed along said highway and coupled to said detecting means for transmitting, in response to the passage of one of said vehicles, a tail of repetitive signals which vary in duration in accordance with the distance along said highway measured from said one vehicle to the respective said detecting means to thereby convey information as to the safe spacing of said vehicles.

7. In a control system for vehicles which are adapted to follow one another along a highway, the combination which comprises means disposed along said highway for detecting the passage of said vehicles, means operated by said detecting means for generating a control voltage which varies in amplitude in accordance with the distance between a pair of said vehicles, and means responsive to said control voltage for transmitting, in response to the passage of the leading one of said pair of vehicles for reception by the following one of said pair of vehicles, a tail of signals which varies in duration in accordance with said distance, said tail of signals carrying information for the control of the spacing between said vehicles along said highway.

8. In a control system for vehicles which are adapted to travel along a highway, the combination which comprises a plurality of means for detecting the passage of said vehicles through adjacent blocks along said highway, means coupled to said detecting means for producing, in response to the passage of one of said vehicles along said highway, a control voltage which varies in amplitude as said vehicle passes from one to another of said blocks, and means responsive to said control voltage for transmitting along said highway behind said vehicle a tail of repetitive signals which change in duration in each of said blocks to thereby afford information for controlling the spacing along said highway between said vehicles.

9. In a control system for vehicles which are adapted to travel along a highway, the combination which comprises a plurality of means for detecting the passage of said vehicles disposed successively in spaced relationship along said highway to define adjacent blocks along said highway, means coupled to each of said detecting means for generating a control voltage which varies in amplitude with the passage of one of said vehicles from one to the next of said adjacent blocks, a plurality of signal transmitting means each associated with a different one of said blocks and each adapted to transmit signals in different ones of said blocks, means for applying to said transmitting means a wave which varies repetitively in amplitude in accordance with a given function of time, means for applying said control voltage to said trnasmitting means, and means included in each of said transmitting means responsive to said wave and said control voltage for transmitting a signal in the block associated therewith which varies in duration in accordance with the distance between said one vehicle and said associated block.

10. A system for signalling along a highway between vehicles which follow one another along said highway which comprises a plurality of means for detecting the presence of said vehicles in different, adjacent blocks along said highway and providing output voltages in response to the presence of said vehicles, a plurality of means for transmitting signals in different ones of said blocks, said transmitting means being separately connected at the inputs thereof to different ones of said detecting means and being adapted to receive said output voltages from said detecting means, a voltage transmission line having successive sections each providing uniform voltage attenuation, said sections being connected successively to the inputs of the ones of said transmitting means adapted to transmit signals in successive ones of said blocks, each of said transmitting means thereby being adapted to receive a control voltage in response to said output voltages at the input terminals thereof varying stepwise in amplitude corresponding to the number of said blocks between said vehicles, means for applying to said transmitting means a wave of step waveform which is repetitive at intervals greater than the intervals between steps of said control voltage, and means included in each said transmitting means responsive to the relative amplitudes of said control voltage and said wave for providing a signal for transmission which varies in duration in accordance with the amplitude of said control voltage.

11. In a vehicle control system having signal responsive vehicle control means associated therewith, the combination comprising means disposed at spaced locations along a path of travel of a vehicle for generating signals of amplitude related to the distance between said vehicle and said locations, and means for propagating along said path a repetitive signal each repetition of which varies in duration correspondingly to the amplitude of said first-named signal to thereby convey information to said control means as to the safe speed for said vehicle.

12. In a control system for vehicles which follow one another as they travel along a highway having signal responsive vehicle control means associated therewith, the combination comprising means disposed along said highway and actuable by one of said vehicles as it travels along said highway for providing at each of several positions along said highway signals varying in amplitude in steps, and means at each of said positions for propagating repetitive signals in a direction opposite to the direction of travel of said vehicles, each repetition of said repetitive signals being of duration related to the amplitude of said first-named signals to thereby convey information to said control means as to the safe speed for said vehicle.

13. In a vehicle control system for vehicles which follow one another along a highway, said system having means for providing, in response to the passage of said vehicles, a control voltage which varies in amplitude in accordance with the distance between said vehicles, a system for transmitting signals along said highway which comprises means for providing a source of electrical signal waves which vary repetitively in amplitude, and signal transmitting means responsive to the relative amplitudes of said control voltage and said waves for transmitting portions of said wave varying in duration in accordance with the amplitude of said control voltage.

14. In a vehicle control system for vehicles which follow one another along a highway, said system having means for providing, in response to the passage of said vehicles, a control voltage which varies in amplitude in accordance with the distance between said vehicles, a system for transmitting signals along said highway which comprises means for providing waves which vary cyclically in amplitude such that several cycles of said waves occur between variations in amplitude of said control voltage, and signal transmitting means responsive to the relative amplitudes of said control voltage and said waves for passing groups of portions of said waves varying in duration in accordance with the amplitude of said control voltage.

15. The invention as set forth in claim 14 wherein said waves from said sources have peak to peak amplitudes equal to the peak to peak amplitude of said control voltage.

16. The invention as set forth in claim 14 wherein said waves vary in amplitude in accordance with a predetermined function of time.

17. The invention as set forth in claim 14 wherein said waves are step waves each step of which varies in amplitude correspondingly to amplitude variations of said control voltage, said step waves having amplitude steps equal in amplitude to the amplitude of said variations in said control voltage.

18. The invention as set forth in claim 17 including means for selectively varying the relative duration of the steps in said step waves.

19. In a vehicle control system for vehicles which follow one another along a highway, said system having means for providing, in response to the passage of said vehicles, a control voltage which varies in amplitude in accordance with the distance between said vehicles, a system for transmitting signals along said highway which comprises a source of waves which vary cyclically in amplitude at a frequency greater than the frequency of occurrence of variations in amplitude in said control voltage, a source of oscillations of frequency higher than the frequency of said waves, means for adding said oscillations to said waves, signal transmitting means including means responsive to the relative amplitudes of said control voltage and said waves and said added oscillations for passing portions of said waves and added oscillations which are greater in amplitude than said control voltage, means for blocking said waves and for passing said added oscillations, and means for propagating said oscillations.

20. In a vehicle control system for vehicles which follow one another along a highway, said system having means for providing, in response to the passage of said vehicles, a control voltage which varies in amplitude in accordance with the distance between said vehicles, a system for transmitting signals along said highway which comprises a source of waves which vary cyclically in amplitude, a gating circuit, means for applying said control voltage and said waves to said gating circuit, means for deriving from said gating circuit portions of said waves which are greater in amplitude than said control voltage, and means for transmitting said portions of said waves.

21. The combination as set forth in claim 19 including a source of oscillations at a frequency much higher than the frequency of said waves, and means for modulating said oscillations with said waves; and wherein said transmitting means includes an antenna, and means for coupling said modulated oscillations to said antenna.

22. In a vehicle control system for vehicles which follow one another along a highway said system having means for providing, in response to the passage of said vehicles, a control voltage which varies in amplitude in accordance with the distance between said vehicles, a system for transmitting signals along said highway which comprises means for providing a source of waves which vary at a frequency approximately ten to twenty times higher than the highest frequencies of occurrence of amplitude variations of said control voltage, a source of oscillations of a frequency which is a plurality of times higher than the frequency of said waves, means for additively combining said waves and said oscillations, a diode for transmitting said waves and said oscillations, means responsive to said control voltage for biasing said diode to block transmission of said combined waves and oscillations which are smaller in magnitude, in the same sense, as said control voltage, and signal amplifying means including a capacitor coupled to said diode having a value of capacitance to block the passage of said waves and to permit the passage of said oscillations.

23. In a vehicle control system for vehicles which follow one another along a highway said system having means for providing a control voltage which varies in amplitude in accordance with the distance between said vehicles, a system for transmitting signals along said highway which comprises means for providing a source of waves which vary in amplitude in accordance with a predetermined function of time, clamping means for clamping said waves to said control voltage to provide clamped waves, a gating circuit responsive to said clamped waves for passing to the output thereof portions of said clamped waves which are greater in magnitude than a predetermined magnitude, and signal transmission means coupled to said output of said gating circuit for transmitting signals corresponding to said portions.

24. In a vehicle control system for vehicles which follow one another along a highway, said system having means for providing a control voltage which varies in amplitude in accordance with the distance between said vehicles, a system for transmitting signals along said highway which comprises a clamping circuit, means for applying to said clamping circuit a wave which varies repetitively in amplitude in accordance with a given function of time, means for applying said control voltage to said clamping circuit as a clamping voltage whereby said wave is clamped to said control voltage, means for superimposing on said wave oscillations of a greater frequency than the frequency of said wave, a diode connected to said clamping circuit and polarized to conduct when voltage of said clamped wave exceeds a predetermined value, a tank circuit connected across the output of said diode, said tank circuit being tuned to the frequency of said oscillations, and means connected to the output of said tank circuit for transmitting said oscillations.

25. In vehicle control system for vehicles which travel along a highway, said system having means for providing a control voltage which varies in amplitude from a reference potential towards increasing potentials of a certain polarity in accordance with the distance along said highway measured from said vehicle, a system for transmitting signals along said highway comprising an amplifying device having at least three electrodes and defining a current path between a first and a second of said electrodes when the voltage between a third of said electrodes and said first electrode is of said certain polarity, means for applying to said third electrode a wave which varies repetitively in amplitude from said reference potential toward increasing potentials of said certain polarity in accordance with a given function of time, means for applying said control voltage to said first electrode, and means connected to said first electrode for deriving an output signal from said device.

26. The invention set forth in claim 25 wherein said amplifying device is a transistor and said first, second, and third electrodes are, respectively, the emitter, collector and base of said transistor.

27. In a control system for vehicles which are adapted to travel along a highway having signal responsive vehicle control means associated therewith, the combination which comprises means for detecting the presence of said vehicles in adjacent blocks along said highway for providing a control voltage which varies in magnitude with the passage of said vehicles between said blocks, and means responsive to said control voltage for transmitting a separate signal along said highway for each variation in said magnitude, said signal conveying information to said control means as to the safe speed for said vehicles.

28. In a control system for vehicles which are adapted to travel along a highway, a control signal generation and transmission system which comprises a plurality of means for detecting the presence of said vehicles in adjacent blocks of said highway, means coupled to said detecting means for providing a control voltage having an amplitude which varies with the passage of said vehicles between said blocks, and transmitting means operated by said control voltage for transmitting a separate signal in each of said blocks for each of said variations in amplitude of said control voltage to thereby convey between said vehicles information as to safe speeds of travel.

29. In a control system for vehicles which follow one another along a highway, the combination which comprises means for detecting the passage of said vehicles over spaced locations along said highway to provide a control voltage in response to the passage of the leading one of said vehicles, which control voltage varies repetitively in magnitude at a rate determined by the speed of said leading vehicle, means for transmitting a signal along said highway for reception by the one of said vehicles which follows said leading vehicle, means for applying oscillations of a frequency higher than the repetition rate of said control signals to said transmitting means, and means included in said transmitting means for operating said transmitting means to transmit said oscillations in response to occurrence of each variation of said control voltage.

30. In a vehicle control system for vehicles which follow one another along a highway, the combination which comprises means for detecting the presence of said vehicles in adjacent blocks spaced along said highway, means coupled to said detecting means for providing a control voltage which varies in amplitude upon passage of one of said vehicles between adjacent ones of said blocks, means for differentiating said control voltage to derive a pulse upon occurrence of each of said variations, a source of oscillations of high frequency, means for gating said oscillations with said pulses to transmit said oscillations upon occurrence of said pulses, and means coupled to said gating means for propagating said oscillations in each of said blocks of said highway.

31. In a control system for vehicles which follow one another along a highway, said system having means for detecting the passage of said vehicles over spaced locations along said highway and providing a control voltage in response thereto, said system also having a transmission line extending along said highway for transmitting said control voltage, apparatus for generating and propagating signals along said highway which comprises antenna means disposed along said highway for propagation of said signals, means for applying oscillations at a certain frequency to said apparatus, means connected between said detecting means and said line for applying said oscillations to said line upon provision of said control voltage by said detecting means, and means for coupling oscillations at said certain frequency from said oscillation applying means and from said line to said antenna means.

32. In a control system for vehicles which follow one another along a highway, said system having a plurality of means for detecting the passage of said vehicles over spaced locations along said highway and for providing a control voltage in response thereto, said system also having a transmission line extending along said highway for transmitting said control voltage, said line having a plurality of sections each corresponding to a different one of said detecting means, apparatus for generating and propagating signals along said highway which comprises a plurality of antenna means disposed along said highway each for propagation of said signals, means for applying oscillations at a certain frequency to said apparatus, a plurality of means each connected between separate ones of said detecting means and the sections of said line corresponding thereto for applying said oscillations to said line upon provision of said control voltage by said detecting means, and a plurality of means each for coupling oscillations at said certain frequency from said oscillation applying means and from different sections of said line to different ones of said antenna means.

33. In a control system for vehicles which follow one another along a highway, said system having a plurality of means for detecting the passage of said vehicles over spaced locations along said highway and providing a control voltage in response thereto, said system also having a transmission line along said highway, said line having a plurality of sections each corresponding to a different one of said detecting means, the combination which comprises a plurality of means each coupling different ones of said detecting means and the one of said plurality of said sections corresponding thereto to each other for applying said control voltage to said line, a plurality of antenna means disposed along said highway, a source of oscillations, a plurality of means each connected between separate ones of said detecting means and the one of said sections of said line corresponding thereto for applying said oscillations to said line upon occurrence of said control voltage from each said separate detecting means, and a plurality of means each for coupling oscillations at said certain frequency from said source and from different sections of said line to different ones of said antenna means.

34. In a vehicle control system for vehicles which travel along a highway, a plurality of detecting means for detecting the presence of a vehicle in successive blocks arranged adjacent to each other along said highway for providing an output voltage in response to the presence of one of said vehicles, a voltage transmission line including series resistors, shunt resistors and a source of voltage greater than a reference potential, said series resistors being connected between adjacent ones of said detecting means said shunt resistors each being connected between different ones of said detecting means and said source of voltage, and a plurality of diodes separately connected between said detecting means and a point at said reference potential, said diodes being polarized to conduct when the output voltage at said detecting means is greater than said reference potential.

35. In a control system for vehicles which follow one another along a highway, the combination comprising a plurality of means for detecting the passage of said vehicles over spaced locations along said highway each providing a control voltage in response to a said vehicle, a voltage attenuating transmission line extending along said highway and having a plurality of attenuating sections each of said attenuating sections including a diode, the diodes in each of said attenuating sections being connected in series with each other, each corresponding to a different one of said detecting means, means for coupling said detecting means to their corresponding sections for applying said control voltage provided by each said detecting means to its corresponding said transmission line section, and holding circuit means included in each said coupling means for changing the amplitude of said control voltage applied to each said section as a function of time.

36. The invention as set forth in claim 35 wherein said amplitude changing means includes a plurality of discharge circuits each connected to a different said detecting means, said discharge circuits each including a capacitor chargeable by said control voltage.

37. In a vehicle control system for vehicles traveling along a highway, said system having means for transmitting tails of signals behind said vehicles corresponding to the speed of said vehicles and the distances therefrom, a receiver for deriving said signals and adapted to be carried by said vehicles which comprises pick-up means responsive to said signals, circuit means coupled to said pick-up means for separating said signals into separate output signals representing, individually, the distance between a pair of said vehicles which follow one another on said highway and the speed of the leading one of said pair of vehicles, and utilization means responsive to at least one of said output signals for providing a warning to the operator of said vehicles.

38. The invention as set forth in claim 37 including circuit means responsive to said output signals representing said distance between said pair of vehicles for overriding said signal representing the speed of said leading vehicle when the distance between said pair of vehicles exceeds a certain distance.

39. In a control system for vehicles which follow one another along a highway along which a tail of signals is transmitted behind one of said vehicles representing the speed of said one vehicle and the distance between said one vehicle and another of said vehicles which follows said one vehicle, a receiver adapted to be carried by said following vehicle for receiving said tail of signals which comprises an antenna for picking up said tail of signals, means coupled to said antenna for separating said signals into a first signal corresponding to said distance and a second signal corresponding to said speed, first circuit means responsive to said first signal for providing at the output thereof a first output voltage which increases in magnitude with increasing distance between said vehicles, second circuit means responsive to said second signal for providing at the output thereof a second output voltage which increases in magnitude with increasing vehicle speed, and utilization means responsive to at least one of said output voltages for controlling the speed of said following vehicle and operable to provide a warning indication to the operator thereof.

40. The invention as set forth in claim 39 wherein said utilization means is responsive to said second output voltage and including circuit means having an input connected to the output providing said first output voltage and having an output connected to the output providing said second output voltage for applying said first output voltage to said output providing said second output voltage when said first output voltage exceeds a predetermined magnitude whereby to override said speed signal when said one vehicle is more than a certain distance from said following vehicle.

41. In a vehicle control system for vehicles which travel along a highway, said system having means for transmitting signals repetitive at a rate representing the speed of a vehicle, a receiver adapted to be carried by one of said vehicles for receiving said signals which comprises means for deriving said signals and for providing output pulses repetitive at the same rate as said signals, means for storing an output voltage corresponding to the speed of said vehicle, and means coupled to said storing means and operated on occurrence of each of said pulses for changing said output voltage stored in said storing means in response to changes in said rate so that said output voltage continually corresponds to the vehicle speed.

42. In a vehicle control system for vehicles which travel along a highway, said system having means for transmitting signals repetitive at a rate representing the speed of a vehicle, a receiver adapted to be carried by one of said vehicles for receiving said transmitted signals which comprises an electrical signal storage device operable to store signals therein, another device operable to provide an output signal which changes in value at a certain rate when operated, means operated on occurrence of said transmitted signals for repetitively initiating operation of said other device, and means also operated on occurrence of said transmitting signals for coupling said other device to said storage device whereby to change the value of said stored signals therein to correspond to the value of output signals provided by said other device, whereby the magnitude of stored signals in said storage device corresponds to the speed of said vehicle.

43. In a control system for vehicles which follow one another along a highway along which a tail of signals is transmitted, which signals are repetitive at a rate representing the speed of a vehicle along said highway, a receiver adapted to be carried by one of said vehicles for receiving said signals, said receiver comprising a timing capacitor, a storage capacitor, a circuit for changing the voltage across said timing capacitor, a circuit for transferring the voltage across said timing capacitor to said storage capacitor, means responsive to said signals for repetitively initiating the change in voltage across said timing capacitor upon occurrence of each of said signals and for operating said transfer means to transfer the voltage across said timing capacitor to said storage capacitor, and utilization means responsive to the magnitude of said voltage across said storage capacitor whereby the speed of a vehicle can be indicated or controlled.

44. In a vehicle control system for vehicles which travel along a highway, said system having means for transmitting signals repetitive at a rate representing the speed of a vehicle, a receiver adapted to be carried by one of said vehicles for receiving said signals which comprises an antenna for deriving said signals, circuit means for generating an output pulse upon occurrence of each of said signals, a timing capacitor, a charging circuit for said timing capacitor, a discharge circuit for said timing capacitor, means controlled by said pulses for operating said discharge circuit slightly after occurrence thereof, a storage capacitor, a circuit for transferring the voltage across said timing capacitor to said storage capacitor, means for connecting said storage capacitor to the output of said transferring circuit upon occurrence of each of said pulses before operation of said discharge circuit, and a metering circuit responsive to the voltage across said storage capacitor for providing an output voltage which increases in accordance with increasing voltage across said storage capacitor and which decreases in accordance with decreasing voltage across said storage capacitor.

45. The combination as claimed in claim 44 including a diode connected between the output of said transferring circuit and said storage capacitor and polarized to conduct when the voltage across said storage capacitor is smaller than the voltage across said output.

46. A receiver adapted for use in a vehicle control system having means for transmitting a tail of signals behind vehicles which follow one another as they travel along a highway, each said tail of signals corresponding to the distance between a pair of successive ones of said vehicles and the speed of the leading one of said pair of vehicles, said receiver comprising means for separating said signals into a first output voltage representing the distance between said pair of vehicles, and a second output representing the speed of the leading vehicle of said pair of vehicles, said first and second output voltages increasing in magnitude in the same polarity sense with increasing distance between and speed of said vehicles, respectively, means for adding a third voltage to said second output voltage when said second voltage exceeds a predetermined magnitude, said third voltage being of polarity opposite to that of said second voltage, and means for controlling the speed of the following one of said pair of vehicles in response to said second voltage.

47. The invention as set forth in claim 46 including means for adding to said second voltage a voltage related to said first voltage and of the same polarity as said second voltage when the amplitude of said second voltage exceeds the amplitude of said first voltage whereby to initiate acceleration of said following vehicle when said leading vehicle accelerates.

References Cited in the file of this patent

UNITED STATES PATENTS

| | | |
|---|---|---|
| 2,576,424 | Sunstein | Nov. 27, 1951 |
| 2,661,070 | Ferrill | Dec. 1, 1953 |
| 2,698,377 | Korman | Dec. 28, 1954 |
| 2,716,186 | Ford | Aug. 23, 1955 |
| 2,803,743 | Ballerait | Aug. 20, 1957 |
| 2,817,012 | Kendall | Dec. 17, 1957 |
| 2,847,080 | Zworykin et al. | Aug. 12, 1958 |